United States Patent
Saishu et al.

(10) Patent No.: US 7,643,552 B2
(45) Date of Patent: Jan. 5, 2010

(54) METHOD FOR DISPLAYING THREE-DIMENSIONAL IMAGE, METHOD FOR CAPTURING THREE-DIMENSIONAL IMAGE, AND THREE-DIMENSIONAL DISPLAY APPARATUS

(75) Inventors: Tatsuo Saishu, Tokyo (JP); Yuzo Hirayama, Yokohama (JP); Kazuki Taira, Tokyo (JP); Rieko Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1133 days.

(21) Appl. No.: 11/133,310

(22) Filed: May 20, 2005

(65) Prior Publication Data

US 2005/0264651 A1 Dec. 1, 2005

(30) Foreign Application Priority Data

May 21, 2004 (JP) ............................. 2004-151891

(51) Int. Cl.
- H04N 7/12 (2006.01)
- H04N 13/04 (2006.01)
- H04N 15/00 (2006.01)
- H04N 9/47 (2006.01)
- H04B 1/66 (2006.01)

(52) U.S. Cl. .................................. 375/240.01; 348/59
(58) Field of Classification Search ............ 375/240.01; 348/51–59
See application file for complete search history.

(56) References Cited

U.S. PATENT DOCUMENTS

| | | | | |
|---|---|---|---|---|
| 5,315,377 A * | 5/1994 | Isono et al. | ................ | 348/51 |
| 6,703,989 B1 * | 3/2004 | Harrold et al. | ................ | 345/32 |
| 6,859,256 B2 * | 2/2005 | Montgomery et al. | ........ | 355/22 |
| 6,980,176 B2 * | 12/2005 | Matsumoto et al. | ............ | 345/6 |
| 2002/0101506 A1 * | 8/2002 | Suzuki | ........................ | 348/51 |
| 2004/0150583 A1 | 8/2004 | Fukushima et al. | | |
| 2004/0218245 A1 * | 11/2004 | Kean et al. | .................. | 359/232 |
| 2004/0252374 A1 | 12/2004 | Saishu et al. | | |

(Continued)

FOREIGN PATENT DOCUMENTS

JP 06-276552 9/1994

OTHER PUBLICATIONS

Son et al.; "Distortion Analysis in Stereoscopic Images"; Opt. Eng. vol. 41, No. 3, pp. 680-685, (2002).

(Continued)

Primary Examiner—Nhon T Diep
(74) Attorney, Agent, or Firm—Finnegan, Henderson, Farabow, Garrett & Dunner, L.L.P.

(57) ABSTRACT

In a II system display apparatus, in a normal display mode, a parallax component image is divided into pieces corresponding to respective columns for a parallax interleaved image. The component image is obtained by subjecting a subject to perspective projection in a vertical direction and to orthographic projection in a horizontal direction. In a compressed and emphasized display mode, the component image is divided into pieces corresponding to respective columns. The component image is obtained by subjecting the subject to perspective projection in both vertical and horizontal directions. In a multiview compatible mode, the component image is divided into pieces corresponding to respective columns so that the same piece is provided for a plurality of adjacent columns. The component image is obtained by subjecting the subject to perspective projection in both vertical and horizontal directions.

17 Claims, 25 Drawing Sheets

U.S. PATENT DOCUMENTS

2005/0117016 A1 * 6/2005 Surman .................. 348/51

OTHER PUBLICATIONS

Onishi et al.; "3D Color Photogaraphic Display Using Light Ray Flux Method"; 3D Image Conference, pp. 169-172, (2002).

Hoshino et al.; "Analysis of Resolution Limitation of Integral Photography"; J. Opt. Soc. Am. A, vol. 15, No. 8, pp. 2059-2065, (1998).

Hirayama et al.; "3D Image Reproduction Apparatus"; U.S. Appl. No. 10/614,195, filed Jul. 8, 2003.

* cited by examiner

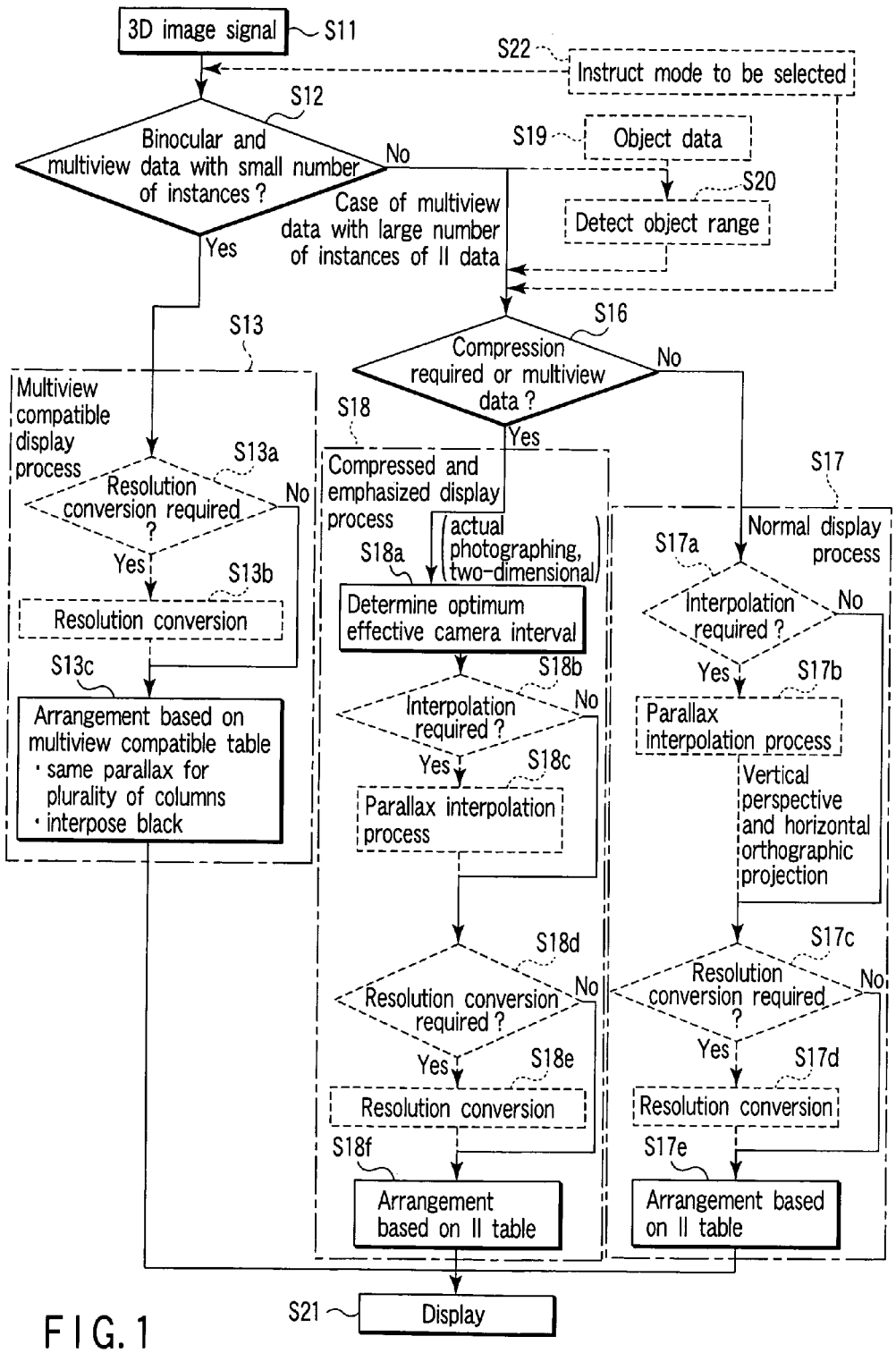
F I G. 1

| Mode | Method for projecting parallax component Image | parallax image arrangement table | Parallax number | Degree of freedom for parallax during three-dimensional display |
|---|---|---|---|---|
| Normal display | Vertical perspective projection and horizontal orthographical projection | 1D-II | Large number | Continuous viewpoint |
| Compressed and emphasized display | Perspective projection in both vertical and horizontal directions | 1D-II | Large number | Continuous viewpoint |
| Multiview compatible display | Perspective projection in both vertical and horizontal directions | Multiview compatible | Small number | Multi-viewpoint (discrete) |

FIG. 3

| Parallax image arrangement table | Arrangement range of parallax components on display surface | Arrangement interval of Parallax components on display screen | Number of sub-pixel columns occupied by each parallax component Image in each element image |
|---|---|---|---|
| 1D-II | predetermined range (determined on the basis of parallax number) | every n sub-pixel columns (n=horizontal pitch/sub-pixel pitch of optical apertures) | one column |
| Multiview compatible | Total range | Every n or n+1 sub-pixel columns (depending on position in screen) | Every m or m+1 columns (m>=2) (depending on position in screen) |
| (comparative example) Multiview | Total range | Every n sub-pixel columns (fixed) | Every m columns (m>=2) (fixed) |

| | Black display section | Right eye image display section | Right and left image separating black display section | Left eye image display section | Black display section |
|---|---|---|---|---|---|
| Example 2-1 | 6 or 7 | 3 | 0 | 3 | 6 |
| Example 2-2 | 5 or 6 | 3 | 1 | 3 | 6 |
| Example 2-3 | 5 or 6 | 4 | 0 | 4 | 5 |
| Example 2-4 | 4 or 5 | 4 | 1 | 4 | 5 |
| Example 2-5 | 4 or 5 | 5 | 0 | 5 | 4 |
| Example 2-6 | 3 or 4 | 5 | 1 | 5 | 4 |
| Example 2-7 | 3 or 4 | 6 | 0 | 6 | 3 |
| Example 2-8 | 2 or 3 | 6 | 1 | 6 | 3 |
| Example 2-9 | 2 or 3 | 7 | 0 | 7 | 2 |
| Example 2-10 | 1 or 2 | 7 | 1 | 7 | 2 |
| Example 2-11 | 1 or 2 | 8 | 0 | 8 | 1 |
| Example 2-12 | 0 or 1 | 8 | 1 | 8 | 1 |
| Example 2-13 | 0 or 1 | 9 | 0 | 9 | 0 |

(Number indicates number of pixel columns)

FIG. 10B

| | Black display section | Parallax 1 image display section | Parallax separating black display section | Parallax 2 image display section | Parallax separating black display section | Parallax 3 image display section | Parallax separating black display section | Parallax 4 image display section | Black display section |
|---|---|---|---|---|---|---|---|---|---|
| Example 4-1 | 1 or 2 | 3 | 1 | 3 | 1 | 3 | 1 | 3 | 2 |
| Example 4-2 | 1 or 2 | 4 | 0 | 4 | 0 | 4 | 0 | 4 | 1 |

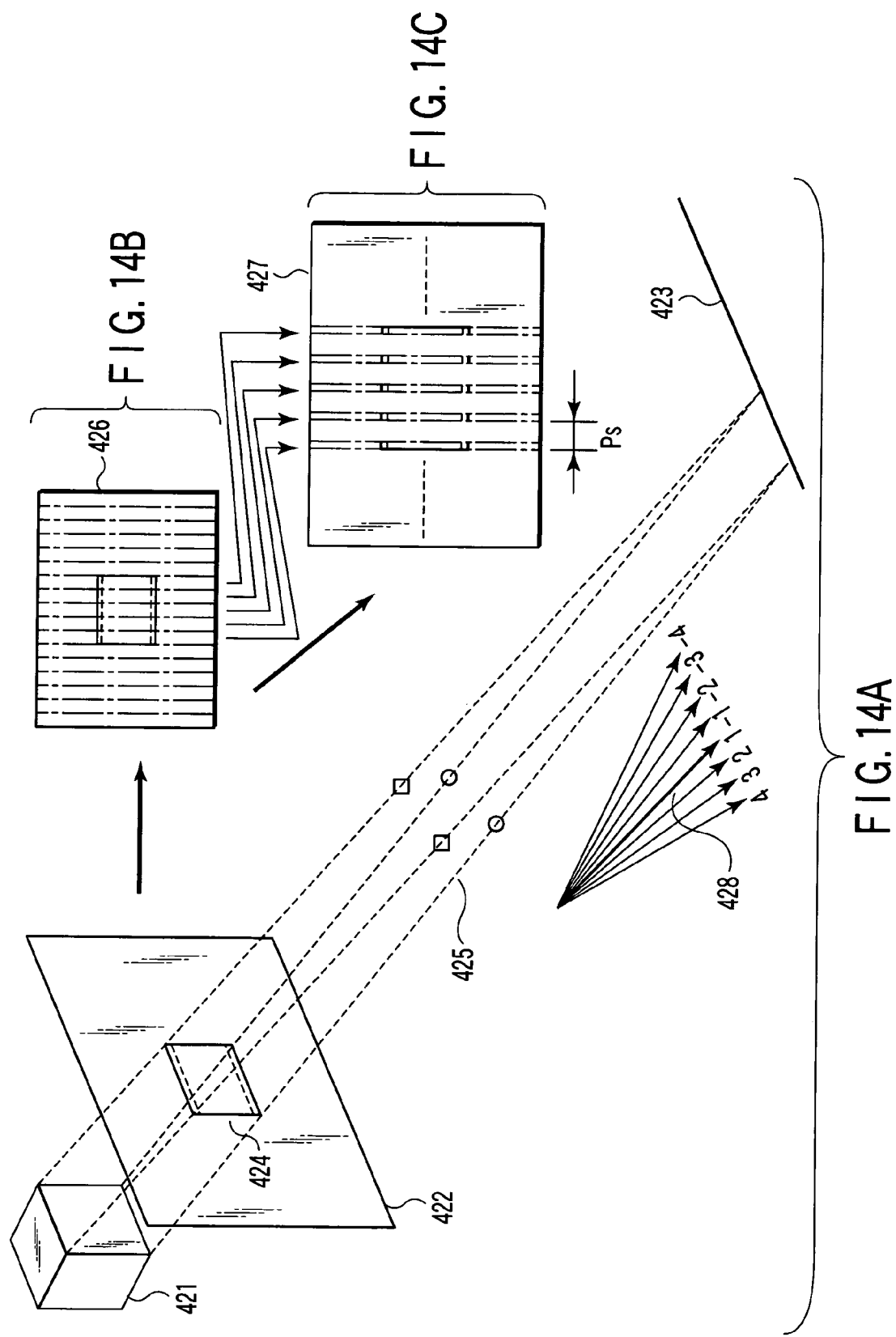

| Parallax number | Slit (lens) number | | 3D pixel number | | area width | LCD sub-pixel number | | LCD pixel number | |
|---|---|---|---|---|---|---|---|---|---|
| | Start (left end) | end (right end) | Start (left end) | end (right end) | | Start (left end) | end (right end) | Start (left end) | end (right end) |
| -17 | -159 | -146 | 2 | 15 | 14 | 11 | 245 | 4 | 82 |
| -16 | -159 | -127 | 2 | 34 | 33 | 12 | 588 | 4 | 196 |
| -15 | -159 | -107 | 2 | 54 | 53 | 13 | 949 | 5 | 317 |
| -14 | -159 | -88 | 2 | 73 | 72 | 14 | 1292 | 5 | 431 |
| -13 | -159 | -69 | 2 | 92 | 91 | 15 | 1635 | 5 | 545 |
| -12 | -159 | -49 | 2 | 112 | 111 | 16 | 1996 | 6 | 666 |
| -11 | -159 | -30 | 2 | 131 | 130 | 17 | 2339 | 6 | 780 |
| -10 | -159 | -10 | 2 | 151 | 150 | 18 | 2700 | 6 | 900 |
| -9 | -160 | 10 | 1 | 170 | 170 | 1 | 3043 | 1 | 1015 |
| -8 | -160 | 30 | 1 | 190 | 190 | 2 | 3404 | 1 | 1135 |
| -7 | -160 | 49 | 1 | 209 | 209 | 3 | 3747 | 2 | 1249 |
| -6 | -160 | 69 | 1 | 229 | 229 | 4 | 4108 | 2 | 1370 |
| -5 | -160 | 88 | 1 | 248 | 248 | 5 | 4451 | 2 | 1484 |
| -4 | -160 | 107 | 1 | 267 | 267 | 6 | 4794 | 3 | 1598 |
| -3 | -160 | 127 | 1 | 287 | 287 | 7 | 5155 | 3 | 1719 |
| -2 | -160 | 146 | 1 | 306 | 306 | 8 | 5498 | 3 | 1833 |
| -1 | -160 | 160 | 1 | 320 | 320 | 9 | 5751 | 3 | 1917 |
| 1 | -160 | 160 | 1 | 320 | 320 | 10 | 5752 | 4 | 1918 |
| 2 | -146 | 160 | 15 | 320 | 306 | 263 | 5753 | 88 | 1918 |
| 3 | -127 | 160 | 34 | 320 | 287 | 606 | 5754 | 202 | 1918 |
| 4 | -107 | 160 | 54 | 320 | 267 | 967 | 5755 | 323 | 1919 |
| 5 | -88 | 160 | 73 | 320 | 248 | 1310 | 5756 | 437 | 1919 |
| 6 | -69 | 160 | 92 | 320 | 229 | 1653 | 5757 | 551 | 1919 |
| 7 | -49 | 160 | 112 | 320 | 209 | 2014 | 5758 | 672 | 1920 |
| 8 | -30 | 160 | 131 | 320 | 190 | 2357 | 5759 | 786 | 1920 |
| 9 | -10 | 160 | 151 | 320 | 170 | 2718 | 5760 | 906 | 1920 |
| 10 | 10 | 159 | 170 | 319 | 150 | 3061 | 5743 | 1021 | 1915 |
| 11 | 30 | 159 | 190 | 319 | 130 | 3422 | 5744 | 1141 | 1915 |
| 12 | 49 | 159 | 209 | 319 | 111 | 3765 | 5745 | 1255 | 1915 |
| 13 | 69 | 159 | 229 | 319 | 91 | 4126 | 5746 | 1376 | 1916 |
| 14 | 88 | 159 | 248 | 319 | 72 | 4469 | 5747 | 1490 | 1916 |
| 15 | 107 | 159 | 267 | 319 | 53 | 4812 | 5748 | 1604 | 1916 |
| 16 | 127 | 159 | 287 | 319 | 33 | 5173 | 5749 | 1725 | 1917 |
| 17 | 146 | 159 | 306 | 319 | 14 | 5516 | 5750 | 1839 | 1917 |

FIG. 15

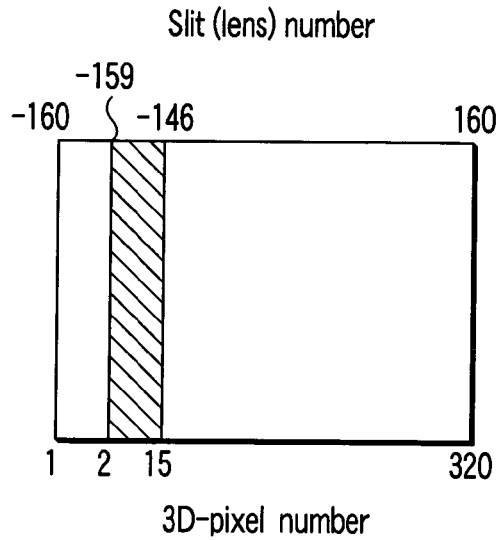
FIG. 16A
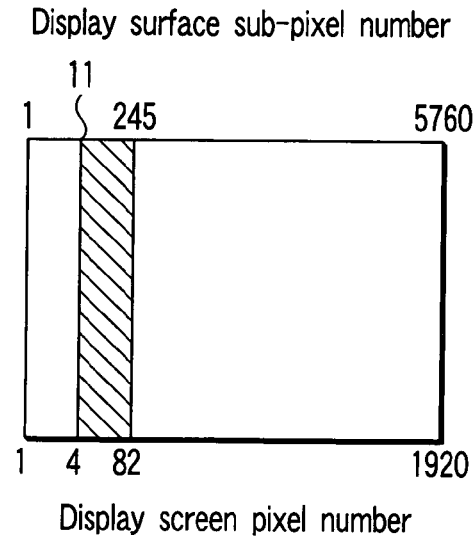
FIG. 16B
| Parallax number | Slit (lens) number | | 3D pixel number | | |
|---|---|---|---|---|---|
| | Start (left end) | end (right end) | Start (left end) | end (right end) | area width |
| -9 | -160 | 160 | 1 | 320 | 320 |
| -8 | -160 | 160 | 1 | 320 | 320 |
| -7 | -160 | 160 | 1 | 320 | 320 |
| -6 | -160 | 160 | 1 | 320 | 320 |
| -5 | -160 | 160 | 1 | 320 | 320 |
| -4 | -160 | 160 | 1 | 320 | 320 |
| -3 | -160 | 160 | 1 | 320 | 320 |
| -2 | -160 | 160 | 1 | 320 | 320 |
| -1 | -160 | 160 | 1 | 320 | 320 |
| 1 | -160 | 160 | 1 | 320 | 320 |
| 2 | -146 | 160 | 1 | 320 | 320 |
| 3 | -160 | 160 | 1 | 320 | 320 |
| 4 | -160 | 160 | 1 | 320 | 320 |
| 5 | -160 | 160 | 1 | 320 | 320 |
| 6 | -160 | 160 | 1 | 320 | 320 |
| 7 | -160 | 160 | 1 | 320 | 320 |
| 8 | -160 | 160 | 1 | 320 | 320 |
| 9 | -160 | 160 | 1 | 320 | 320 |
5760
FIG. 17

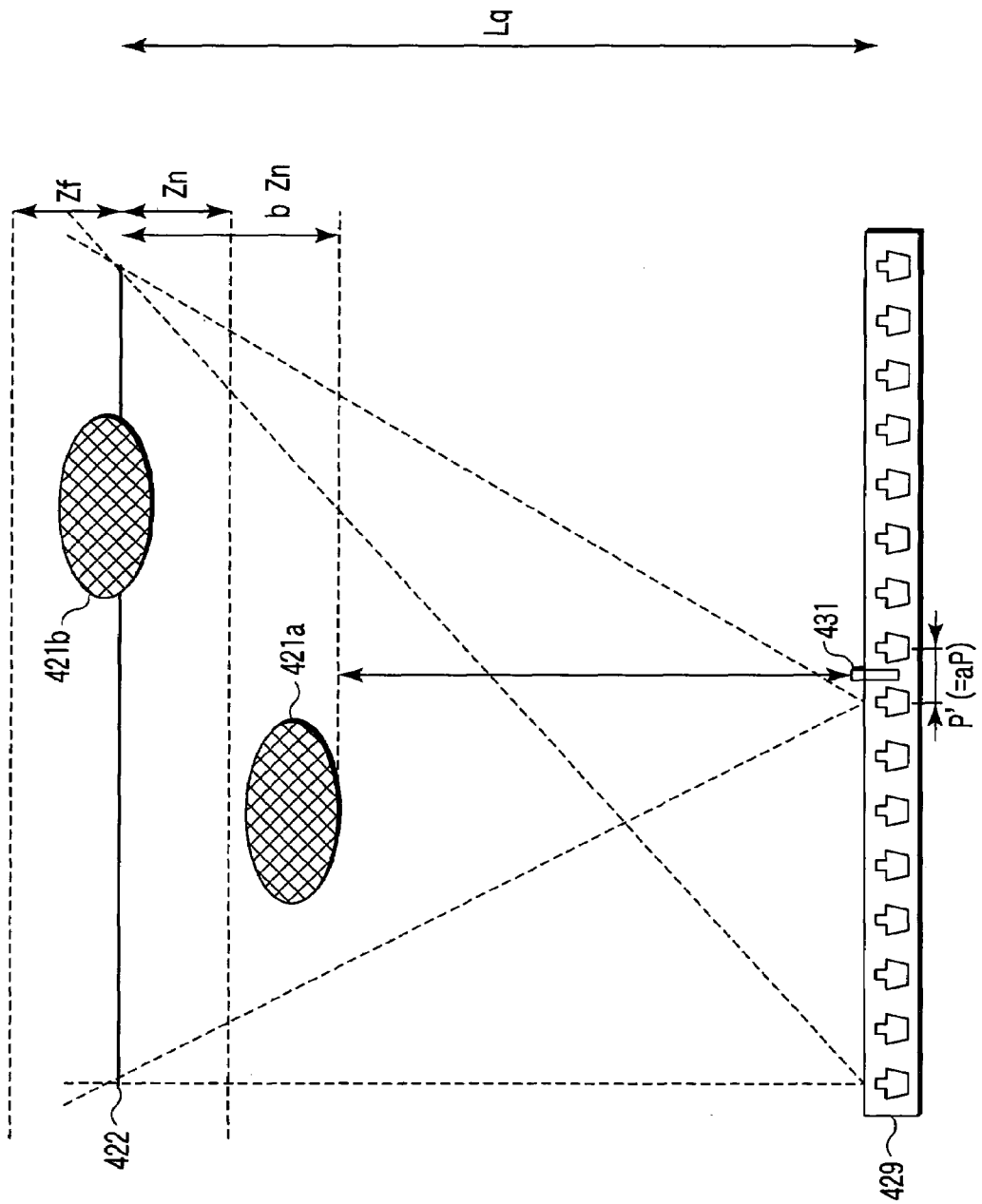
F I G. 26

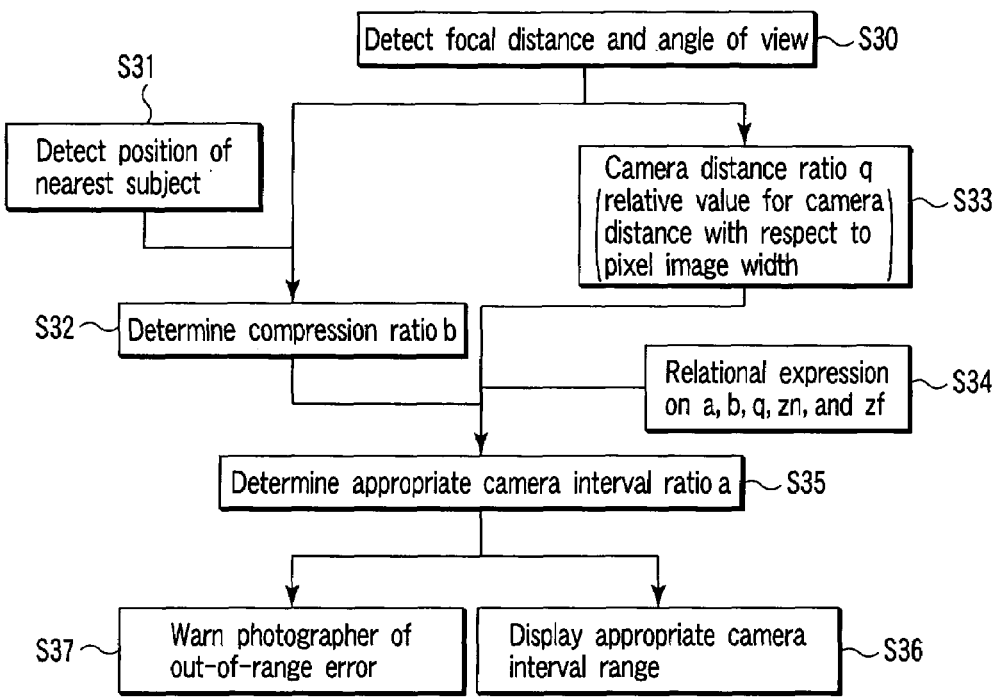
F I G. 27A
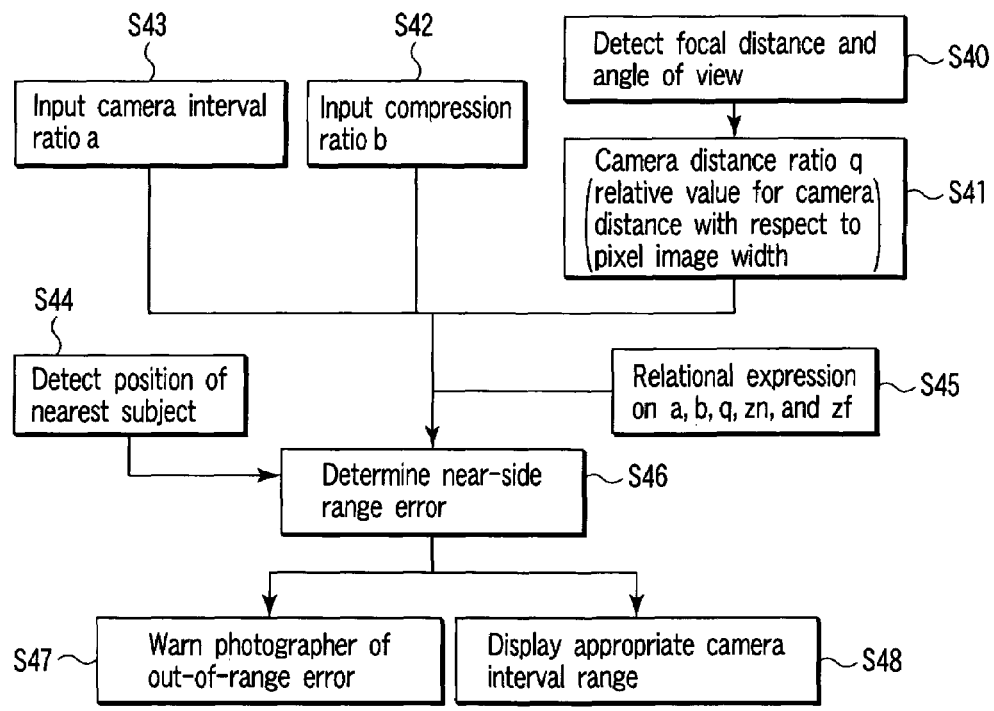
F I G. 27B

METHOD FOR DISPLAYING THREE-DIMENSIONAL IMAGE, METHOD FOR CAPTURING THREE-DIMENSIONAL IMAGE, AND THREE-DIMENSIONAL DISPLAY APPARATUS

CROSS-REFERENCE TO RELATED APPLICATIONS

This application is based upon and claims the benefit of priority from prior Japanese Patent Application No. 2004-151891, filed May 21, 2004, the entire contents of which are incorporated herein by reference.

BACKGROUND OF THE INVENTION

1. Field of the Invention

The present invention relates to a method of displaying a three-dimensional image, a method of capturing a three-dimensional image, and an apparatus that displays a three-dimensional image.

2. Description of the Related Art

Various systems are known for apparatuses that display three-dimensional images, i.e. stereoscopic images, and that can display motion pictures, that is, three-dimensional displays. In recent years, there has been a growing demand particularly for a system of a flat panel type which does not require the use of specific viewing exclusive glasses or the like. Some three-dimensional motion picture display apparatuses of this kind utilize the principle of holography, which is difficult to put into practical use. In a known system that can display three-dimensional images relatively easily, a parallax barrier (also referred to as a ray control element) is installed immediately before a direct-vision or projection type display apparatus, for example, a display panel (display apparatus) such as a liquid crystal display apparatus or a plasma display apparatus which has fixed pixel positions; the parallax barrier controls light rays from the display panel so that the rays are directed to an observer.

The parallax barrier controls light rays so that different images can be viewed even at the same position on the parallax barrier by varying angle. Specifically, a slit or a lenticular sheet (cylindrical lens array) is used to provide only lateral parallax (horizontal parallax). A pinhole array or a lens array is used to provide vertical parallax in addition to lateral parallax. Systems using the parallax barrier are further classified into a binocular system, a multiview system, a super-multiview system (a multiview system to which super-multiview conditions are added), and an integral imaging system (simply referred to as an II system below). The basic principle of these systems is substantially the same as that of a system invented about ten years earlier and used for three-dimensional photographs.

The integral imaging system (II system) is described using terms for three-dimensional photography. Accordingly, some documents refer to it as integral photography (also referred to as IP below).

The II system is characterized by having a high degree of freedom for a viewpoint position and enabling easy three-dimensional viewing. A display apparatus with a high resolution can be relatively easily implemented using an II system having only horizontal parallax and not having vertical parallax (simply referred to as a one-dimensional II system or 1D-II system). In contrast, the binocular or multiview system provides only a narrow range of viewpoint positions at which the observer can three-dimensionally view images, that is, a narrow viewing area. Thus, disadvantageously, this system fails to allow the observer to see images easily. However, the binocular or multiview system is the simplest configuration for three-dimensional image display apparatuses. This system also has the advantage of allowing display images to be easily created.

In general, the difference between the II system and the lenticular sheet (LS) system is a plane on which pixels are present, that is, an image plane or a focal plane. However, in a practical design, particularly with a large number of pixels, the difference between the image plane and the focal plane is at most 0.1 mm even without any aberration. It is thus difficult to distinguish the image plane from the focal plane owing to a limit on accuracy. It is also difficult to determine whether light rays are converged at a viewing distance, owing to the limit on accuracy. The term II system, as used in the specification, means a system which does not involve the distinction based on the pixel position on the image plane and on the focal plane but which uses an arbitrary (continuous) lateral (substantially horizontal) viewpoint position at which a normal three-dimensional image is visible at the viewing distance. Further, the term multiview system means a system which is not equivalent to the LS system (does not require the convergence of light rays) and with which at the viewing distance, the normal three-dimensional image is visible at a lateral viewpoint position determined on the basis of interocular distance.

With either the II system or the multiview system, the viewing distance is normally finite. Accordingly, a display image is created so that a perspective projection image at that viewing distance is actually visible. With the II system providing only horizontal parallax and not providing vertical parallax, if the horizontal pitch of the parallax barrier is an integral multiple of the horizontal pitch of the pixel, a set of parallel rays is produced (referred to as parallel-ray II below). Further, the parallel-ray II system provides a correctly projected three-dimensional image by displaying on a display surface a parallax interleaved image obtained by dividing a parallax component image into pieces corresponding to respective pixel arrays, the parallax component image having been perspectively projected at a specified viewing distance in the vertical direction and orthographically projected in the horizontal direction, and then appropriately arranging the pieces.

It is difficult to implement an image capture apparatus that photographs images by varying the projection method and projection central distance between the vertical direction and the horizontal direction because in particular, orthographic projection requires a camera or lens having the same size as that of a subject. Accordingly, to obtain orthographic projection data through image capture, it is practical to convert perspective projection image capture data into divided and arranged image data. In addition, for example, a method is known which interpolates image data using EPI (epipolar plane image).

With the II system, as disclosed in J. Opt. Soc. Am. A vol. 15, p. 2059 (1998), the front- and rear-side reproducible ranges of a three-dimensional image display apparatus are relatively narrow; typical values are about 10 cm in each direction. However, to eliminate restrictions on the position of an object to be displayed, it is necessary to increase the degree of freedom in the front- and rear-side reproducible ranges of the three-dimensional image display apparatus. Some multiview systems that synthesize perspective projection images to form a three-dimensional image display perspective-projection three-dimensional images in which the front and rear sides are emphasized (three-dimensional images which are compressed in a rear-side direction and which have nulls close to the camera). However, with the parallel-ray II system that forms orthographic projection images into a three-dimensional image, no three-dimensional images such as those described above have been created and no methods for creating such images have been found.

The parallel-ray II system advantageously provides easier-to-see images than the binocular system. However, the parallel-ray II system uses a complicated image format in terms of the projection method or division and arrangement method. The binocular and multiview system performs the simplest display of three-dimensional images and thus uses a simple image format. For actual photographing, it is possible to combine parallax component images captured using two cameras arranged in the horizontal direction, as they are. Since some stereoscopic contents are intended for the binocular system, a display apparatus for the parallel-ray II system can desirably deal with a perspective-projection two-image image format, that is, desirably has upward compatibility. To deal with this format, it is possible to interpolate binocular data to display easy-to-see images for the II system. However, it is difficult to interpolate or extrapolate a large number of instances of parallax component images on the basis of a small number of, i.e., two parallax component images for the binocular system. No known methods enable a display apparatus for the parallel-ray II system to display binocular data substantially as it is.

As described above, the conventional three-dimensional image display apparatus for the parallel-ray II system fails to appropriately deal with stereoscopic contents in a variety of image formats, particularly contents obtained through perspective projection.

BRIEF SUMMARY OF THE INVENTION

It is an object of the present invention to provide a three-dimensional image display apparatus which can display perspective projection images for the binocular and multiview system and the like and which can display three-dimensional images compressed in the rear-side direction or three-dimensional images emphasized in the vertical and horizontal directions on the front and rear sides.

According to an aspect the present invention, there is provided a three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures so controlling light rays from the pixels as to define, on the display surface, elemental images each of which has a width determined depending on an observation standard viewing distance;

a first processing unit configured to divide a parallax component image into pieces corresponding to the respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint; and a second processing unit configured to divide a parallax component image into pieces corresponding to the respective columns in a compressed and emphasized display mode, the parallax component image being obtained by subjecting the subject to perspective projection substantially determined by the viewing distance in both vertical and horizontal directions, each predetermined range of the elemental images being allotted to one column and displayed on the display module to generate a three-dimensional image with a continuous viewpoint in which a subject image is compressed in a depth direction and emphasized in the vertical and horizontal directions.

According to another aspect of the present invention, there is provided a method of displaying a three-dimensional image on a three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures controlling light rays from the pixels, and defining, on the display surface, elemental images each of which has a width determined depending on an observation standard viewing distance; and a first processing unit configured to divide a parallax component image into pieces corresponding to respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint;

the method of displaying a three-dimensional image comprising:

dividing a parallax component image into pieces corresponding to respective columns, the parallax component image being obtained by subjecting the subject to perspective projection substantially determined by the viewing distance in both vertical and horizontal directions, allotting each column to a corresponding predetermined range of the elemental images, and displaying the columns on the display module to display a three-dimensional image with a continuous viewpoint in which a subject image is compressed in a depth direction and emphasized in the vertical and horizontal directions using a compressed and emphasized display mode, wherein on the basis of a photographing standard condition that a horizontal interval for perspective projection photographing of each parallax component is determined depending on a horizontal interval for positions at which the pixels are projected via the parallax barrier at the viewing distance, a wide-angle projecting process is executed by setting a distance between the photographing position and a projection plane q times as long as a viewing distance based on the standard condition and setting the horizontal interval for the perspective projection photographing of each parallax component at most q/b of the standard condition to compress the subject in the depth direction by a factor of b.

Moreover, according to a yet another aspect of the present invention, there is provided a method of capturing and displaying a three-dimensional image on the three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures controlling light rays from the pixels, and defining, on the display surface, elemental images each of which has a width determined depending on an observation standard viewing distance; and a first processing unit configured to divide a parallax component image into pieces corresponding to respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint;

the method of displaying a three-dimensional image comprising dividing a parallax component image into pieces corresponding to respective columns, the parallax component image being obtained by subjecting the subject to perspective projection substantially determined by the viewing distance in both vertical and horizontal directions, allotting each column to a corresponding predetermined range of the elemental images, and displaying the columns on the display module of the three-dimensional image display apparatus to display a three-dimensional image with a continuous viewpoint in which a subject image is compressed in a depth direction and emphasized in the vertical and horizontal directions using a compressed and emphasized display mode, wherein on the basis of a photographing standard condition that a horizontal interval for perspective projection photographing of each parallax component is determined depending on a horizontal interval for positions at which the pixels are projected via the parallax barrier at the viewing distance, a wide-angle projecting process is executed by setting a distance between the photographing position and a point of regard of the subject q times as long as a viewing distance based on the standard condition and setting the horizontal interval for the perspective projection photographing of each parallax component at most q/b of the standard condition to compress the subject in the depth direction by a factor of b.

Furthermore, according to a further aspect of the present invention, there is provided a three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures controlling light rays from the pixels, and defining, on the display surface, elemental images each of which has a width determined depending on an observation standard viewing distance;

a first processing unit configured to divide a parallax component image into pieces corresponding to respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint; and a second processing unit configured to divide a parallax component image into pieces corresponding to respective columns in a multiview compatible mode, the parallax component image being obtained by subjecting the subject to perspective projection substantially determined by the viewing distance in both vertical and horizontal directions, each predetermined range of the elemental images being allotted to a plurality of adjacent columns as the same parallax information and displayed on the display module to generate a three-dimensional image with multiple viewpoints.

BRIEF DESCRIPTION OF THE SEVERAL VIEWS OF THE DRAWING

FIG. 1 is a flowchart showing a mode switching process in a three-dimensional image display apparatus according to an embodiment of the present invention;

FIG. 3 is a diagram showing a comparison of modes for the three-dimensional image display apparatus shown in FIGS. 1 and 2;

FIG. 4 is a table showing a parallax image arrangement table for the three-dimensional image display apparatus shown in FIG. 3 and a parallax image arrangement table for a three-dimensional image display apparatus according to a comparative example;

FIGS. 10A and 10B is a table showing the arrangement of parallax images in a binocular and multiview compatible mode in the three-dimensional image display apparatus and the method of image display according to the embodiment of the present invention;

FIGS. 14A, 14B, and 14C are schematic diagrams schematically showing a method of projecting a parallax component image and a method of dividedly arranging the parallax component image in a parallax interleaved image, in a normal display mode for the three-dimensional image display apparatus shown in FIG. 12;

FIG. 15 is a table showing an example in which a parallax component image is dividedly arranged in a parallax interleaved image, in the normal display mode and in a compressed and emphasized display mode of the three-dimensional image display apparatus shown in FIG. 12;

FIGS. 16A and 16B are diagrams showing an example of the range of data required for one parallax component image as well as an example in which the parallax component image is dividedly arranged in a parallax interleaved image, in the three-dimensional image display apparatus shown in FIG. 15;

FIG. 17 is a table showing an example in which a parallax component image is dividedly arranged in a parallax interleaved image, in a standard multiview three-dimensional display apparatus having the same number of instances of parallax as that of the three-dimensional image display apparatus shown in FIG. 12;

FIG. 26 is a plan view schematically showing a method of capturing a three-dimensional image as well as the positional relationship between a projection plane and a subject according to the embodiment of the present invention; and FIGS. 27A and 27B are flowcharts showing a process executed before photographing in the method of capturing a three-dimensional image according to the embodiment of the present invention.

DETAILED DESCRIPTION OF THE INVENTION

With reference to the drawings, a detailed description will be given of a three-dimensional image display apparatus and method according to an embodiment of the present invention.

The term "column" as used in the specification refers to a minimum unit column of pixels in a horizontal direction. The column refers to a sub-pixel row in a normal liquid crystal display apparatus in which each pixel is divided into sub-pixels of three colors (R, G, and B) arranged in the horizontal direction.

Figure 2:
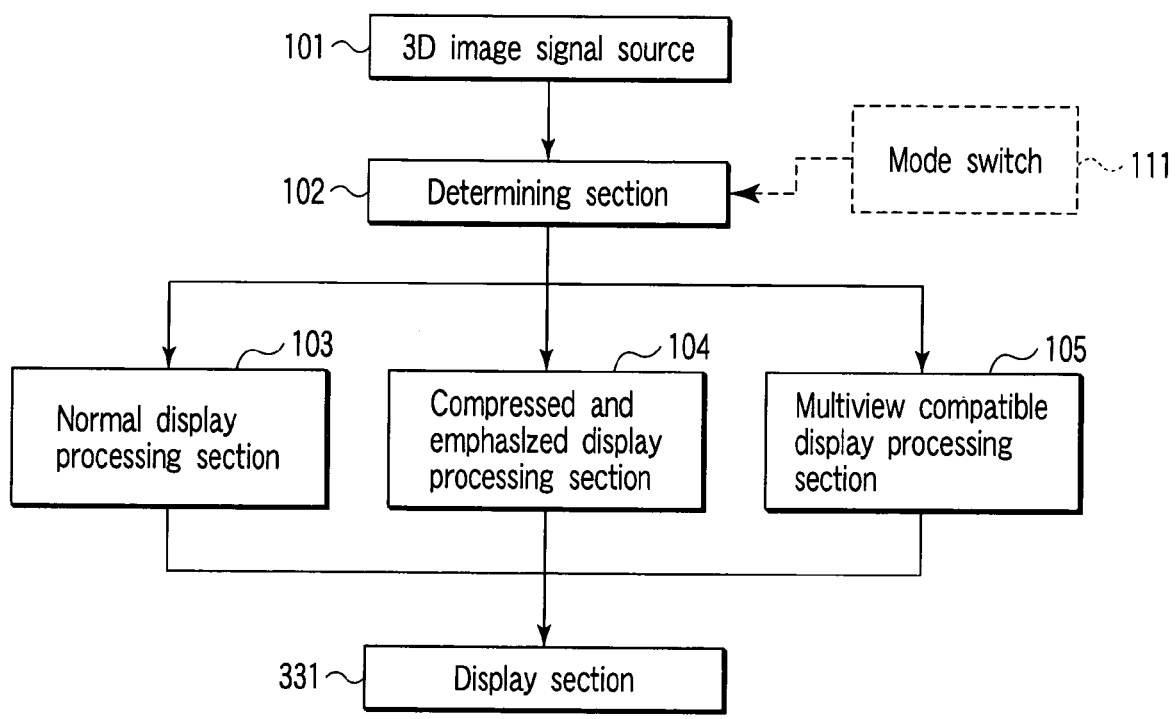
FIG. 2 is a block diagram showing the mode switching process in the three-dimensional image display apparatus according to the embodiment of the present invention.

First, with reference to FIGS. 1 and 2, description will be given of a procedure of displaying a three-dimensional image in three modes in a three-dimensional image display apparatus. FIGS. 1 and 2 show a flowchart and a block diagram applied to a three-dimensional image display apparatus and method according to the embodiment of the present invention.

The flowchart shown in FIG. 1 shows a process by which a display module (display) for a parallel-ray II system can display a three-dimensional image in any of a (e) normal display mode, a (b) compressed and emphasized display mode, and a (c) binocular and multiview compatible display mode.

The block diagram shown in FIG. 2 corresponds to the flowchart shown in FIG. 1. FIG. 2 shows the configuration of a display apparatus that can display a three-dimensional image in any of the (e) normal display mode; the (b) compressed and emphasized display mode, and the (c) binocular and multiview compatible display mode.

As shown in the tables in FIGS. 3 and 4, in the normal display mode, image data for the II system (parallax component image data created on the basis of the parallel-ray II system and indicating a parallax component image orthographically projected in the horizontal direction and perspectively projected in the vertical direction) is distributed in the display module for the II system in accordance with a parallax image arrangement table for the II system to display a three-dimensional image. In the compressed and emphasized display mode, the following data are distributed in the display module for the II system in accordance with the parallax image arrangement table for the II system to display a three-dimensional image in which the front and rear sides are compressed with the vertical and horizontal directions emphasized (nulls are close to the camera): multiview data with a large number of instances of parallax and parallax component image data indicating a parallax component image prospectively projected in both horizontal and vertical directions. In the binocular and multiview compatible display mode, multiview data with a small number of instances of parallax is distributed in the display module for the II system in accordance with a multiview compatible parallax image arrangement table to display a three-dimensional image. As already described, the term II system, as used in the specification, means that at a viewing distance, a normal three-dimensional image is visible at an arbitrary (continuous) lateral (substantially horizontal) viewpoint position. The term binocular and multiview system means that at the viewing distance, the normal three-dimensional image is visible at a lateral viewpoint position determined on the basis of interocular distance (this viewpoint position involves multiple viewpoints and is discrete).

The parallax arrangement table shows how parallax component images are arranged in elemental images of a parallax interleaved image (consisting of a large number of elemental images) displayed on a display surface. The II system parallax image arrangement table differs from the multiview compatible parallax image arrangement table in the arrangement range or interval of the same parallax data (a parallax component image, that is, an image projected at a single camera position) on the display surface and the number of columns occupying each elemental image, as shown in FIG. 4. However, with the II system parallax image arrangement and the multiview compatible parallax image arrangement, the elemental images have common positions and widths (as long as observation standard viewing distance is fixed); the only difference is a method of rearranging parallax components images in elemental images. If optical apertures in slits or lenses are shaped like vertical stripes, rows have the same parallax arrangement (however, if a color filter array varies depending on the rows, only the color component varies). Accordingly, a procedure of dividing a parallax component image into pieces corresponding to respective columns and arranging the pieces in a parallax interleaved image can be collectively executed on one column (on all the rows). If the optical apertures have oblique or other complicated shapes or pixels are arranged on the display surface in a delta array, the parallax arrangement varies depending on the rows. However, the same parallax arrangement is used for rows for which the horizontal positions of the optical apertures and the pixel positions have the same vertical position relationship. Consequently, the procedure of dividing a parallax component image into pieces corresponding to respective columns and arranging the pieces in a parallax interleaved image can be collectively executed on the rows with the same vertical position relation-ships. Thus, the parallax arrangement tables determine pixel rows to be arranged in the vertical direction of a display module 331 as well as columns to be arranged in the horizontal direction of the display module 331. Parallax component image data is distributively arranged in the determined pixel rows and columns.

FIG. 4 shows a parallax arrangement table for a common multiview system three-dimensional display apparatus as a comparative example. A hardware configuration (the relationship between parallax barrier pitch and pixel width) and the positions and widths of elemental images according to the comparative example are different from those according to the present invention.

As shown in the flowchart in FIG. 1 and the block diagram in FIG. 2, an image signal for a three-dimensional image (3D image signal) starts to be input by a signal source 101 as shown in step S11. Then, the apparatus first determines whether image data contained in this image signal is binocular or multiview image data with a small number of instances of parallax (a determining 102 and step S12). The 3D image signal is obtained by synthesizing parallax component images constituting one frame of display image, in a certain format. This format can be used for the determination. If the image data contained in the image signal is binocular or multiview image data with a small number of instances of parallax, a multiview image processing 105 processes the image data (step S13) and distributes parallax component images in accordance with the multiview compatible arrangement table (step S13c). The display module 331 then displays the images (step S21). Specifically, as described later in detail, the same parallax component image is provided for a plurality of image column groups. A display in black or a predetermined color is provided in the columns in the column groups provided with the same parallax component image. For an II display apparatus in which a horizontal resolution determined by the horizontal pitch of slits or lenses differs from the maximum vertical resolution determined by the vertical pixel pitch of the display module, if the horizontal and vertical resolutions for input binocular or multiview data differ from those of the II display apparatus, the resolutions are converted as required (steps S13a and S13b). On the basis of the arrangement of the parallax component image data, a parallax interleaved image is two-dimensionally displayed in the display module 331. The parallax interleaved image is then passed through a parallax barrier to allow an observer to observe a three-dimensional image according to the multiview system in front of the apparatus. Whether the number of instances of parallax in the multiview data is large or small means whether or not it is at least about half the number of instances of parallax (parallax barrier horizontal pitch/sub pixel horizontal pitch) in II display provided by a three-dimensional display apparatus intrinsically designed for the II display. If the number of instances of parallax in the multiview data is at least about half that in the II display, it is relatively easy to increase viewpoints by using parallax interpolation. Accordingly, the interpolated II parallax arrangement table is suitably used in the compressed and emphasized display mode. In contrast, the use of the binocular and multiview compatible display mode is not suitable because this may cause marked vertical-band-like area separations. If the number of instances of parallax in the multiview data is not at least about half that in the II display, the binocular and multiview compatible display mode is suitable because it is difficult to increase viewpoints by using parallax interpolation.

In step S12, if the image data is multiview image data with a large number of instances of parallax or is intended for the II system, the determining section 102 determines in step S16 whether the image data is to be displayed in the compressed and emphasized display mode or is perspective projection multiview data. If neither case is true, for example, if the image data is intended for the II system and is normally displayed using the II system, then a normal processing 103 executes a normal process in step S17. The determining section 103 determines in step S17a whether or not the II system image data requires interpolation. The required number of instances of parallax is determined on the basis of the configuration of the parallel-ray 1D-II system display apparatus (how many times the parallax barrier horizontal pitch is as large as the column pitch) and observation standard viewing distance. If interpolation or resizing is required, for example, if the number of instances of parallax in the input data is smaller than the intrinsically required value, interpolated or extrapolated parallax component image information is obtained on the basis of adjacent parallax to create image data having the interpolated or extrapolated parallax components (step S17b). Alternatively, for an II display apparatus in which the horizontal resolution determined by the horizontal pitch of slits or lenses differs from the maximum vertical resolution determined by the vertical pixel pitch of the display module, if the horizontal and vertical resolutions for input II data differ from those of the II display apparatus, the resolutions are converted as required (steps S17c and S17d). Subsequently, the parallax component images are distributed in accordance with the 1D-II arrangement table (step S17e). A parallax interleaved image is then displayed in the display module 331 (step S21). As a result, a three-dimensional image is formed via the parallax barrier so as to have a continuous parallax from a front-side direction (an area closer to the observer with respect to the apparatus) to a rear-side direction (an area located behind the apparatus and opposite the observer) of the apparatus. The three-dimensional image is observed by the observer.

In step S16, if the image data must be displayed in the compressed and emphasized mode or is perspective projection multiview data, an emphasis processing section 104 executes a compressed and emphasized display process as shown in step S18. Here, the compressed and emphasized display is required when the subject has such a front and rear sides—as prevent a subject image actually obtained by photographing from being clearly displayed in a space located in front of the apparatus and behind the apparatus as described later. In this case, perspective projection parallax component image data corresponding to the subject image is interpolated and has its resolution converted as required so that a camera interval (photographing interval) is smaller than a corresponding standard condition and so that the subject is photographed as in the case of the use of a wide-angle lens. The data is thus converted into image data suitable for the compressed and emphasized display (steps S18a to S18e). The converted parallax component images are distributed in accordance with the 1D-II arrangement table (step S18f). A parallax interleaved image is displayed in the display module 331 (step S21). As a result, a three-dimensional image is clearly observed which has been compressed in the areas within the front- and rear-side limit distances from the apparatus and which has been emphasized in the vertical and horizontal directions. When the compression ratio is maximized in the compression and emphasis process, the image data is converted into planar data (two-dimensional data) that does not display the rear-side direction of the subject. If such converted image data is provided to the display module 331, the three-dimensional image is not displayed but only a simple two-dimensional image (two-dimensionally projected image) is displayed. In this sense, the compression and emphasis process includes not only the compression of the subject image in a longitudinal direction but also a conversion into a two-dimensional image. The conversion uses a substantially one parallax component image as all parallax component images.

In the image data input to the apparatus, a three-dimensional image signal shown in step S11 may be accompanied by object data or positional data on the subject which can be referenced (step S19). In this case, the range of the object is detected in accordance with a direction in which the object is to be displayed. The data on the range is extracted. The existence range information is transmitted to the processing in steps S16 and S18 (step S20).

In the above process, the determination for binocular and multiview data in step S12 is based on the attribute or format of the data. However, the determination may be pre-specified by a mode selection instruction using a mode switch 111 (step S22). For example, if an image is displayed during actual photographing, a photographer may specify the use of binocular and multiview data. Alternatively, if three-dimensional image data is stored in a medium, a mode switch signal may be generated when the medium is installed in a drive device. This eliminates the need for the determination in step S12.

Alternatively, the determination in step S16 may be similarly pre-specified by a mode selection instruction using the mode switch 111 (step S22). Further, the switch, which can be operated by the observer, may be installed on the apparatus so as to be manually operated.

Alternatively, it is possible to use an image creating apparatus provided separately from the display apparatus to execute the above process without installing mode switching means such as the one described above, as a part of the display apparatus.

Figure 5B:
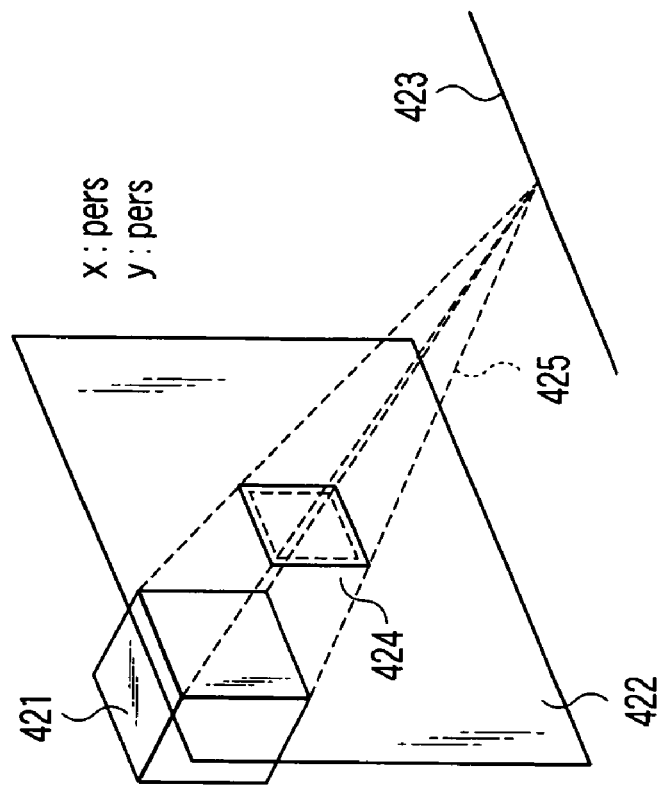
FIGS. 5A and 5B are perspective views showing a method of projecting a parallax component image with a three-dimensional image display apparatus and method according to the embodiment of the present invention.
Figure 5A:
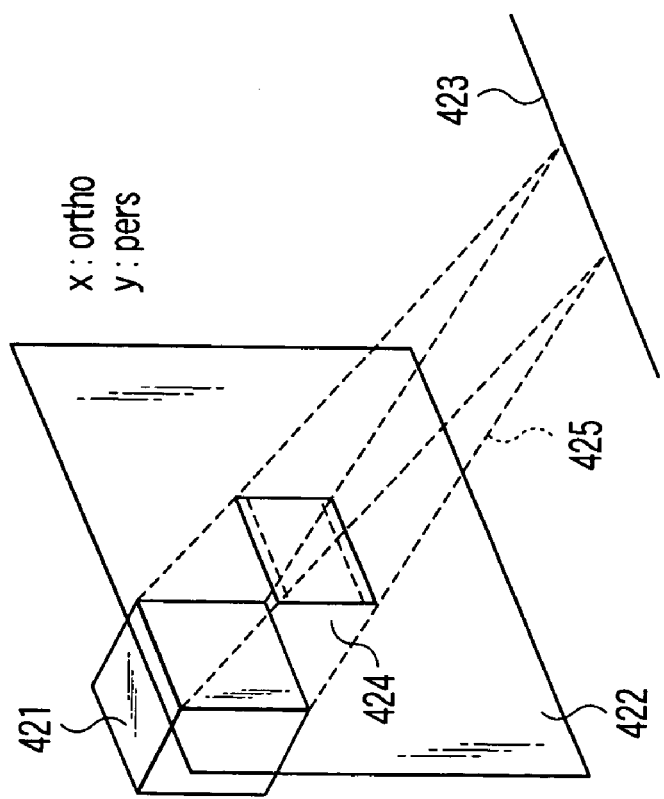
Figure 6A:
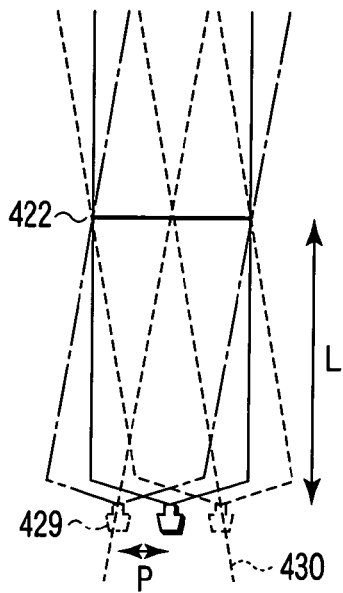
FIGS. 6A, 6B, and 6C are plan views showing a method of capturing a three-dimensional image according to the embodiment of the present invention, which is associated with the method of projecting a parallax component image in the three-dimensional image display apparatus.
Figure 6B:
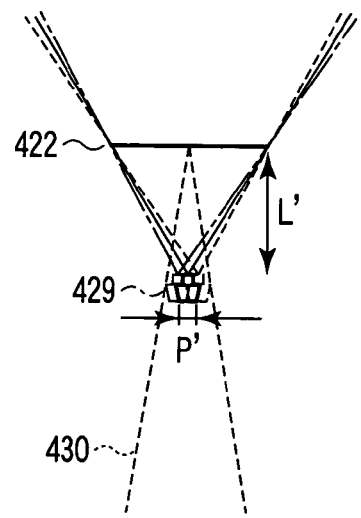
Figure 6C:
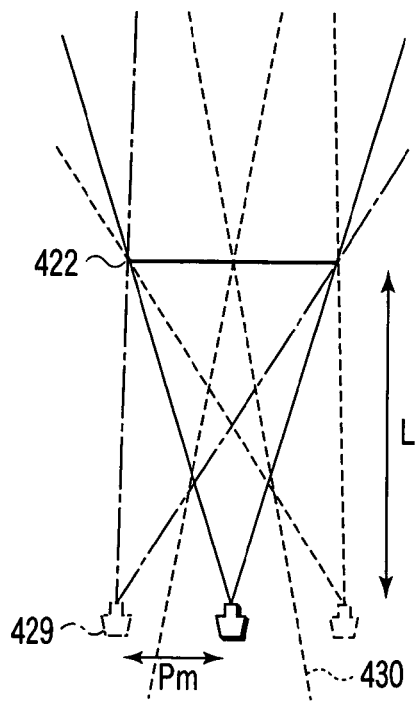

FIGS. 5A and 5B are perspective views schematically illustrating a projection method applied to a method of displaying an image according to the embodiment of the present invention. FIGS. 6A, 6B, and 6C are plan views schematically illustrating a method of capturing and projecting a three-dimensional image which method is applied to the method of displaying a method as shown in FIGS. 5A and 5B. FIG. 5A shows a method of projecting each parallax component image perspectively projected in the vertical direction and orthographically projected in the horizontal direction in order to form a three-dimensional image in the normal display mode (the display mode intrinsically used for the parallel-ray 1D-II system). FIG. 5B shows a method of projecting each parallax component image perspectively projected in both vertical and horizontal directions in order to form a three-dimensional image in the compressed and emphasized display mode (for II or multiview image data) or in the binocular and multiview compatible mode. FIG. 6A shows a method of image capture and projection with which each parallax component image is photographed and projected by orthographic projection in the horizontal direction in the normal display mode (perspective projection in the vertical direction). FIG. 6B shows a method of image capture and projection with which each parallax component image is photographed and projected by wide-angle perspective projection in which the movement interval of a camera 429 in the compressed and emphasized display mode is set at a value P' that is smaller than an interval P (also referred below to as the position and interval of the camera 429 based on the normal or standard condition) intrinsically determined from the apparatus configuration. FIG. 6C shows a method of image capture and projection with which each parallax component image is photographed and projected by wide-angle perspective projection in which the movement interval of the camera 429 in the binocular and multiview compatible mode is set at an interocular distance interval Pm that is larger than the normal camera interval P.

In FIGS. 5A and 5B, reference numeral 421 denotes a subject to be photographed (also an object image to be displayed).

In the normal display mode, a projected image 424 of the subject 421 projected on a projection plane 422 (corresponding to a parallax barrier surface) constitutes one parallax component image as shown in FIG. 5A. Parallax component images thus obtained are arranged in a parallax interleaved image. The parallax interleaved image is displayed on the display surface. When the image of the subject 421 is observed from a projection center line 423 (reference line) set at the viewing distance, a three-dimensional image of the subject 421 is observed behind the apparatus. In the normal display mode, the projected image 424 corresponds to a two-dimensional image in which the subject 421 undergoes perspective projection in the vertical direction and orthographic projection in the horizontal direction. Therefore, projection lines 425 for the projected image 424 all converge at the projection center line 423.

In the binocular and multiview compatible mode, the projected image 424 of the subject 421 projected on the projection plane 422 (corresponding to the parallax barrier surface) similarly constitutes one parallax component image as shown in FIG. 5B. Parallax component images thus obtained are arranged in a parallax interleaved image. The parallax interleaved image is displayed on the display surface. When the image of the subject 421 is observed from the projection center line 423 (reference line; the line formed by the projection central points of the parallax components arranged in parallel) set at the viewing distance, a three-dimensional image of the subject 421 is observed behind the apparatus. In the binocular and multiview compatible mode, the image is subjected to perspective projection in both vertical and horizontal directions. Therefore, the projection lines 425 all converge at a projection central point on the projection center line 423 (reference line). In the binocular and multiview compatible mode, one of the observer's pupils is located at the projection central point on the projection center line 423. When the observer's other pupil is located at another projection central point on the projection center line 423, the observer observes the pair of projected images 424 with both eyes. As a result, the three-dimensional image of the subject 421 is observed behind the apparatus. However, since the three-dimensional display apparatus for II display approximately performs multiview display, light rays emitted during the display gather front the projection central point but do not converge precisely at one point.

In the compressed and emphasized display mode, the projected image of the subject 421 projected on the projection plane 422 (corresponding to the parallax barrier plane) constitutes one parallax component image also as shown in FIG. 5B. The arrangement of parallax components image during display is the same as that in the case of a projection method such as the one shown in FIG. 5A. When the image of the subject 421 is observed from the projection center line 423 (reference line) set at the viewing distance, a three-dimensional image is observed behind the apparatus, the image having been slightly distorted by compressing it in the rear-side direction of the subject 421 and emphasizing it in the vertical and horizontal directions. In the compressed and emphasized display mode, the image is subjected to perspective projection in the vertical and horizontal directions during projection. Consequently, the projection lines 425 all converge at a projection central point on the projection center line 423 (reference line). However, during the display, the projection lines 425 of the projected image 424 all converge on the projection center line 423 as shown in FIG. 5A but not at any projection central point as shown in FIG. 5B.

The projected image shown in FIG. 5A is acquired using the photographing method shown in FIG. 6A. The projected image shown in FIG. 5B is acquired using the photographing method shown in FIG. 6B or 6C. Specifically, with the photographing method shown in FIG. 6A and corresponding to the normal display mode for the parallel-ray 1D-II system, the subject is photographed using perspective projection, in the vertical direction, and using orthographic projection, in the horizontal direction. With the photographing method shown in FIG. 6B and corresponding to the compressed and emphasized display mode and the photographing method shown in FIG. 6C and corresponding to the binocular and multiview compatible mode, the subject is photographed using perspective projection, in both vertical and horizontal directions.

Figure 7:
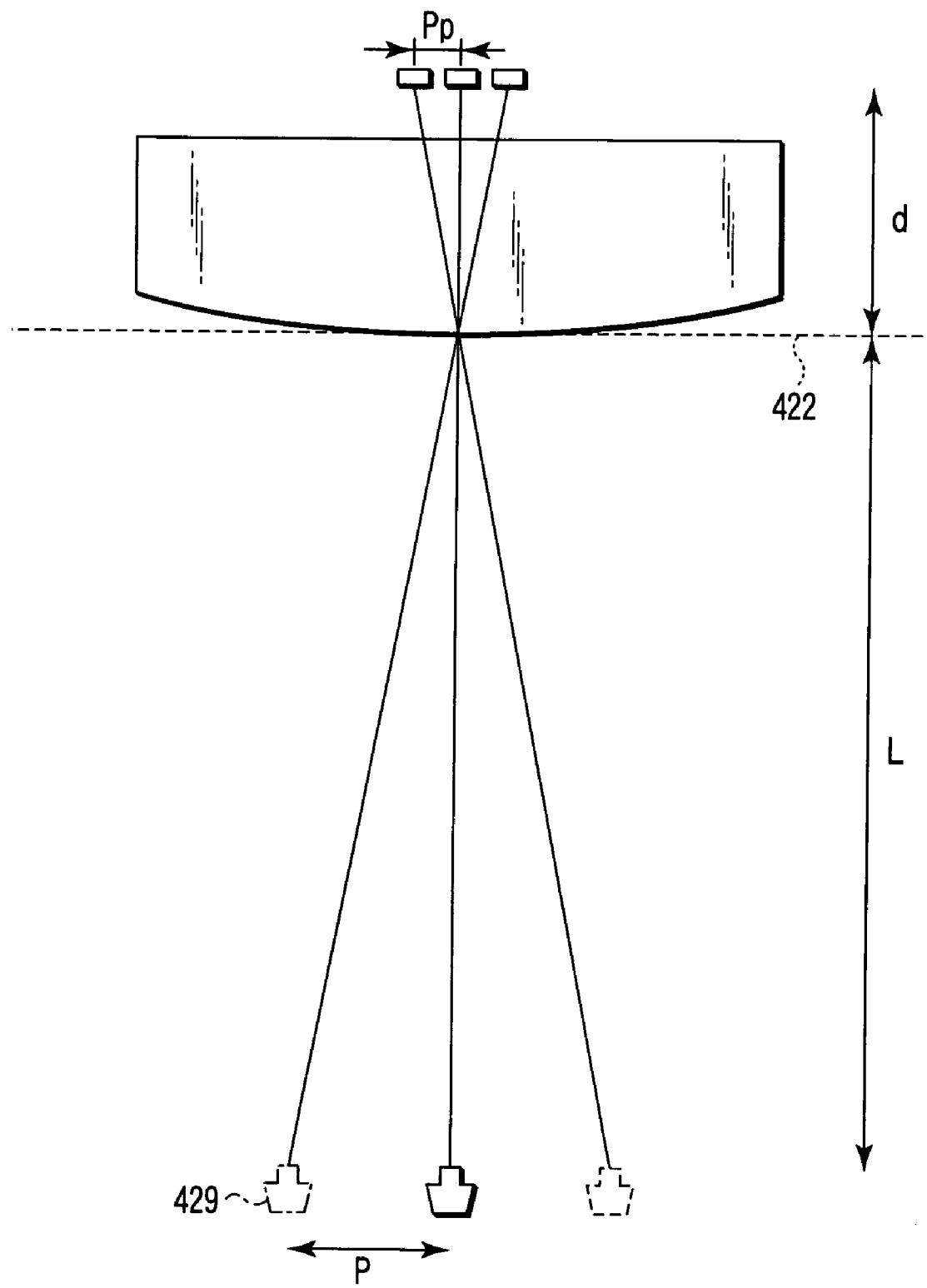
FIG. 7 is a plan view illustrating the standard interval between camera positions in the method capturing a three-dimensional image according to the embodiment of the present invention.

FIG. 7 illustrates a normal (standard condition) camera interval P intrinsically determined from the apparatus configuration. The normal (standard condition) camera distance (the distance between the projection plane and the camera located in front of the projection plane) is the same as an observation standard viewing distance L. The normal (standard condition) camera interval P is determined by the pixel pitch Pp and observation standard viewing distance L on a display screen with respect to the projection plane 422, as well as the gap d between the display surface and each optical aperture in the parallax barrier. In this case, d in FIG. 7 is drawn on the assumption that the medium is entirely composed of air and that a principal ray is not refracted. However, if a glass substrate or lens is used, its refractive index causes the principal ray to be refracted. Consequently, in actual dimensions, d has a converted value. The observation standard viewing distance L determines the width of elemental images (the division and arrangement table for parallax component images). If the screen size of the display module is different from the size of an actual photographing plane (projection plane) range, L and P are increased or reduced in proportion to that ratio. The results are a standard camera distance and a standard camera interval for actual photographing. This also applies to a front- and rear-side limit distances zn and zf described later. If the screen size of the display module is different from the size of the actual photographing plane (projection plane) range, zn and zf are increased or reduced in proportion to that ratio. The results are limit distances for actual photographing. A horizontal interval for projection and photographing for each parallax is determined to be a photographing standard condition on the basis of horizontal intervals for the positions at which the pixels are projected via the parallax barrier at the observation standard viewing distance.

If setting is made so that the image is compressed by a factor of b in the depth direction using wide-angle perspective projection in the compressed and emphasized display mode, the following conditions are required. (1) The subject is photographed using perspective projection, in both vertical and horizontal directions. That is, the subject is photographed using the normal perspective projection camera 429 as well as perspective projection as shown in FIG. 6B. (2) A camera distance L' is set to be q (in most cases, q<1 but q>=1 is allowed) times as long as the observation standard viewing distance (standard camera distance) L. In other words, the subject 421 is photographed as in the case of the use of a wide-angle lens as shown in FIG. 6B. (3) A camera interval P' for each parallax component is set smaller than q/b of the standard camera interval P (P'<=P·q/b). This process suppresses the blur and distortion of a displayed three-dimensional image. (4) A table used to arrange parallax component images on the display surface is created on the basis of the width of the elemental images calculated using the observation standard viewing distance L.

A simple description will be given of derivation of conditional expressions based on these conditions. To simplify the forms of the conditional expressions, the observation standard viewing distance (standard camera distance) and the position of the camera in front of the subject are set at 1 and (0, 0, 1), respectively, with the projection plane defined as an xy plane. The generality of the conditional expressions is not lost even under this assumption. Two perspective projection cameras 429 inherently projects the coordinates (x1, y1, z1) of the subject at (xr1, yr1, 0) and (xl1, yl1, 0) on the projection plane. However, for emphasis, the camera interval and distance are multiplied by a and q, respectively, (a<q<=1) to project the coordinates at (xr2, yr2, 0) and (xl2, yl2, 0). Then, the image is reproduced as if it were projected with the camera interval P and the camera distance of 1. Consequently, the three-dimensional image appears to be at (x2, y2, z2). In the case of reproduction with light rays for the perspective projection camera 429 (multiview), transformations are as follows.

$$z2 = az1/(q - z1 + az1)$$

$$x2=qx1/(q-z1+az1)$$

$$y2=qy1/(q-z1+az1)$$

In the case of reproduction with light rays for the orthographic projection camera 429 (parallel-ray II system with only the horizontal parallax: 1D-II), transformations are as follows.

$$z2=az1/(q-z1)$$

$$x2=qx1/(q-z1)$$

$$y2=qy1(q-z1-az1)/(q-z1)$$

Intrinsic front- and rear-side reproduction areas for the II system are determined by the pixel pitch, the lens pitch, and the effective gap between optical apertures and pixels (J. Opt. Soc. Am. A vol. 15, p. 2059 (1998)). If the z coordinate of a front-side limit is zn, the coordinate of rear-side limit is zf, and an object lying within a range b times as large as the intrinsic front- and rear-side reproduction areas is compressed in the z direction, then the camera interval may be multiplied by a (<1) in order to increase the front-side reproduction area zn0 (=zn/L) by a factor of b (>1) at a camera distance q (<=1) with respect to a viewing distance of 1. For z1=bzn0 and z2<=zn0, in the case of reproduction with light rays for the perspective projection camera 429, the following expression is given.

$$a<=(q-bzn0)/(b-bzn0)$$

In the case of reproduction with light rays for the orthographic projection camera 429 (parallel-ray 1D-II), the following expression is given.

$$a<=(q-bzn0)/b$$

Approximation makes it possible to consider this expression to be a<=q/b. That is, a three-dimensional image free from distortion or blur can be displayed by setting the ratio a of the camera interval P' to P to at most q/b. Reducing the camera interval P' below the intrinsic value P and the ratio a of P' to P from q/b toward zero means that the image gets closer to a two-dimensional one. Setting a at a value close to q/b means that a three-dimensional image can be displayed.

Figure 8A:
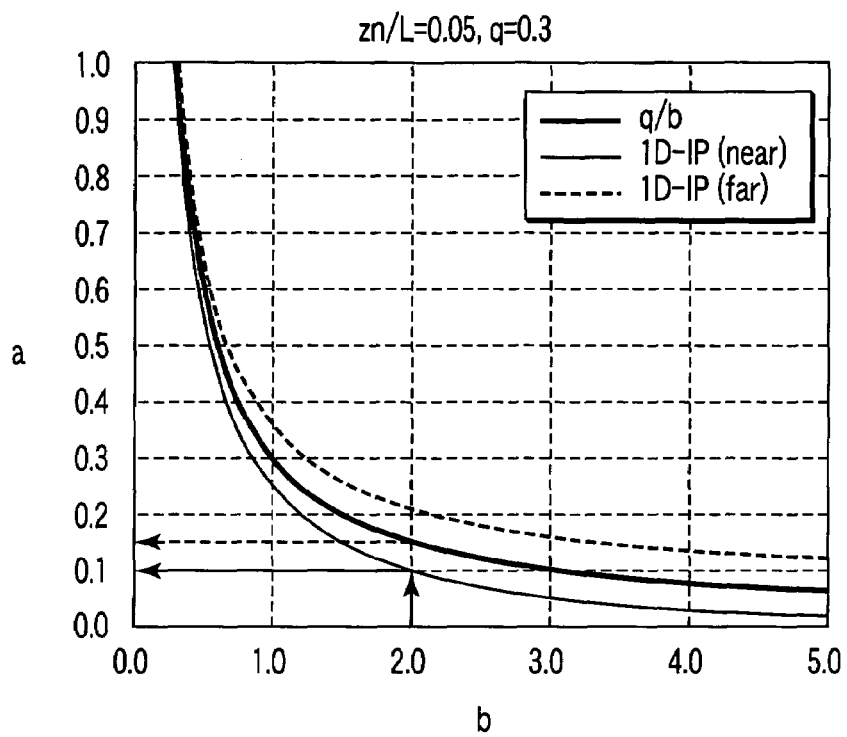
FIGS. 8A and 8B are graphs showing the relationship between compression ratio in a front- and rear-side directions and the appropriate interval between camera positions in the method and apparatus for three-dimensional image display and the method of image display according to the embodiment of the present invention.
Figure 8B:
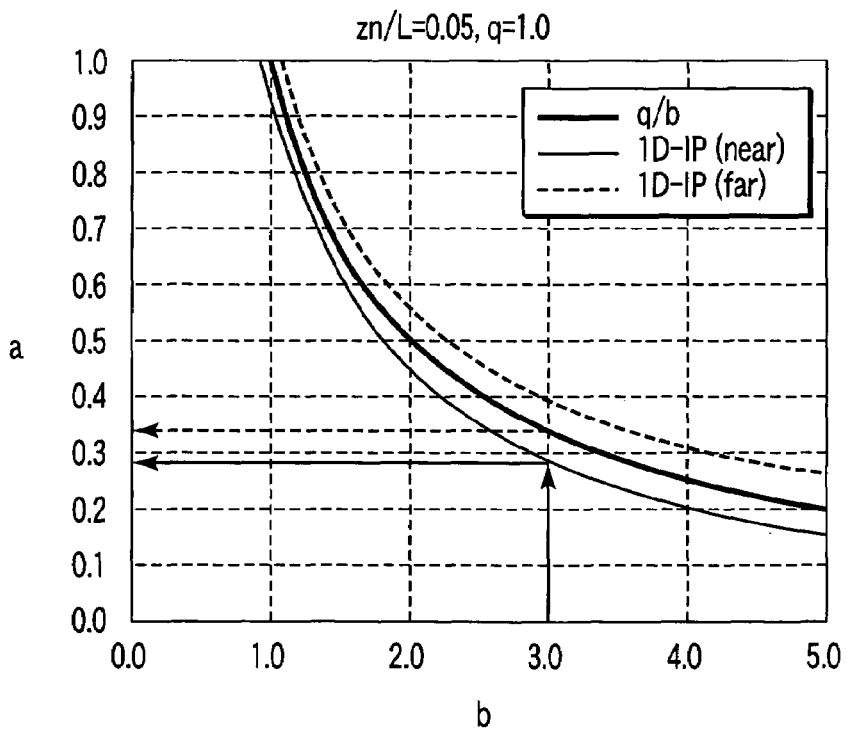

FIGS. 8A and 8B are graphs showing the relation-ship between a, b, q, zn, and zf (depth reproduction area) based on the above calculations. In FIGS. 8A and 8B, the axis of abscissa indicates depth direction compression ratio b. The axis of ordinate indicates a coefficient a for the camera interval. The thick solid line indicates a=q/b. The solid line (1D-IP (front)) shows a curve for the front-side area. The dashed line (1D-IP (rear)) shows a curve for the rear-side area. FIG. 8A shows a case for zn/L=0.05 and q=0.3. FIG. 8B shows a case for zn/L=0.05 and q=1.0. As is apparent from FIGS. 8A and 8B, a reduction in camera interval (in coefficient a) increases the z coordinate zf of the rear-side limit compared to the z coordinate zn of the front-side limit. For example, for an observation standard viewing distance of 0.7 m (=L), a camera distance of 0.21 m (=Lq), and a front-side reproduction area of 0.035 m (=zn=Lzn0), q=0.3, zn0=+0.05, and b=2 are set (an image with a front-side amount of +0.07 m is to be compressively displayed). Then, as shown by the dashed arrow in FIG. 8A, the camera interval may be set within the range a<=q/b=0.15. Setting a=0.1 as shown by the solid arrow ensures that blur and distortion can be suppressed in the front-side area and prevents the loss of stereoscopic effect. In this case, in the rear-side direction, the rear-side area can be displayed without blur up to b=3, that is, up to -0.105 m. In another example, for an observation standard viewing distance of 0.7 m (=L), a camera distance of 0.7 m (=Lq), and a front-side reproduction area of 0.035 m (=zn=Lzn0), q=1, zn0=+0.05, and b=3 are set (an image with a front-side amount of +0.105 m is to be compressively displayed). Then, as shown by the solid arrow in FIG. 8B, the camera interval may be set within the range a<=q/b=0.33. Setting a=0.29 as shown by the solid arrow ensures that blur and distortion can be suppressed in the front-side area and prevents the loss of stereoscopic effect. In this case, in the rear-side direction, the rear-side area can be displayed without blur up to b=4, that is, up to -0.14 m.

The actual camera distance with respect to the observation standard viewing distance L is arbitrary. The rate q of the camera distance to L may be equal to or larger than 1. This condition includes a camera interval P' of zero, which corresponds to a 2D display mode with a perspective projection image without any parallax (q: arbitrary, b: infinite).

The above method makes it possible to display a three-dimensional image with little distortion or blur observed or with its three-dimensionality emphasized, on the II system display, by directly displaying perspective projection image data without converting the image data into orthographic projection data in the horizontal direction. Since the perspective projection data can be utilized as it is and can thus be processed at high speed, the above method is suitable for displaying actually photographed images, in particular, in real time. Accordingly, the compressed and emphasized display mode can always be utilized in order to display actually photographed data.

In the compressed and emphasized display mode, three-dimensionality is emphasized so that the size of the front side is increased in the vertical and horizontal direction while the size of the rear side is reduced in the vertical and horizontal directions. Enlargement and reduction rate is almost equal in the vertical direction and in the horizontal direction. However, strictly speaking, on the front side, the rate is slightly larger in the horizontal direction. On the rear side, the rate is slightly larger in the vertical direction. Accordingly, distortion can be corrected by displaying a parallax interleaved image enlarged by about several to several tens of percents in the vertical direction if the image contains a large number of front-side objects, or displaying a parallax interleaved image reduced by about several percents in the vertical direction if the image contains only rear-side objects. The parallax interleaved image may be enlarged or reduced in the vertical direction by for example, adjusting the size of the projection plane when a parallax component image is created or the enlargement or reduction may be carried out during the resolution conversion in S18 (compressed and emphasized display process) in FIG. 1. The standard camera interval is also equal to the ray interval (the interval between two light rays from horizontally adjacent pixels if the optical apertures are shaped like vertical stripes) of the II three-dimensional system display apparatus. However, a smaller ray interval enables distortion to be more easily prevented. A reduction in observation standard viewing distance also enables distortion to be more easily prevented because it reduces the ray interval. However, a decrease in ray interval reduces the viewing area width (the product of the ray interval and the number of instances of parallax) over which the observer can observe a normal three-dimensional image. It is thus necessary to ensure a minimum viewing area width of about 100 to 200 mm (the width is increased if much crosstalk occurs), which is somewhat larger than the interocular distance; the ray interval cannot be set too smaller. For some applications, the size of the projection plane may be varied so that the projection plane at the front-side limit position (front projection plane)

always has the same size or width. This prevents a front-side subject from protruding from the screen. However, the size of the protruding subject remains unchanged.

Figure 9A:
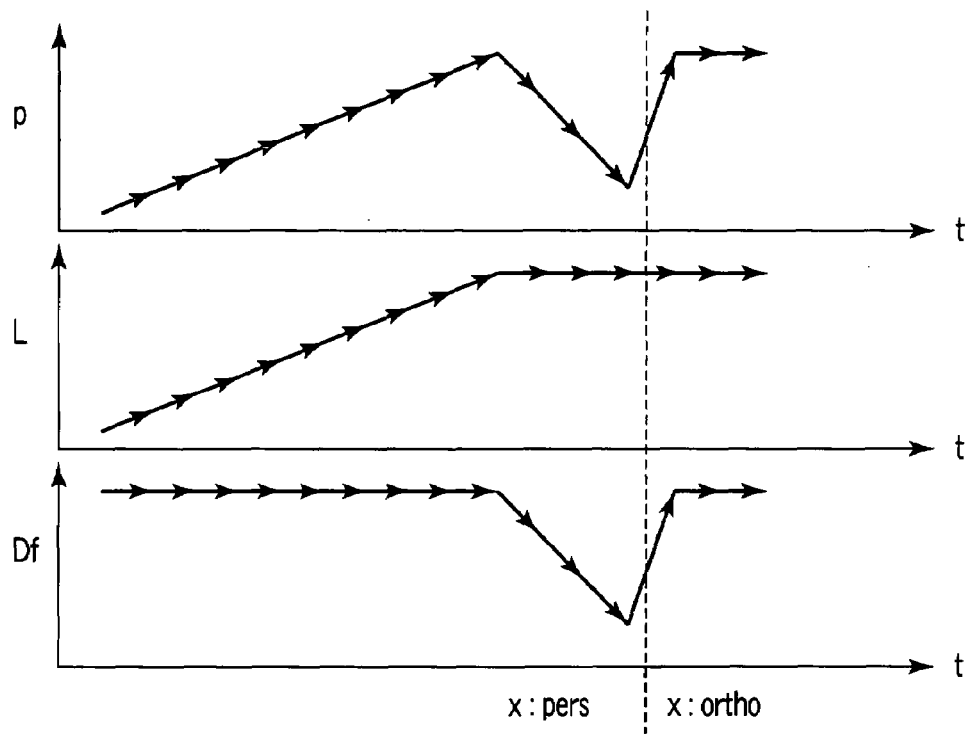
FIGS. 9A and 9B are graphs schematically showing a method of continuously switching between a normal mode and a compression and emphasis mode in the method and apparatus for three-dimensional image display and the method of image display according to the embodiment of the present invention.
Figure 9B:
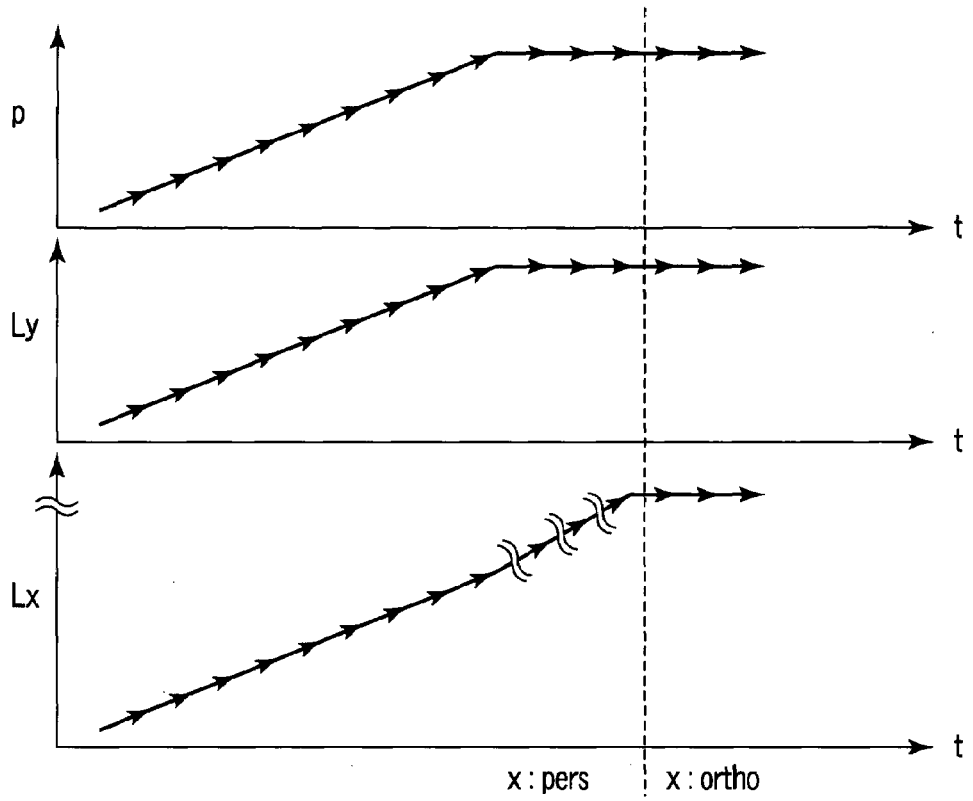

FIGS. 9A and 9B show, by way of example, how to vary camera interval P, camera distance L (Lx denotes the horizontal direction and Ly denotes the vertical direction), and depth of field Df in order to continuously switch from the compressed and emphasized display mode to the normal display mode. Left of the dashed line corresponds to the compressed and emphasized display mode. Right of the dashed line corresponds to the normal display mode. The arrows represent temporal steps for the continuous switching (the reverse temporal steps are also possible). If the camera interval P is not changed before switching the mode, a change in image (apparent movement of the coordinates) is slightly marked. When a compressed and emphasized display mode with a much reduced camera interval P (corresponding to an area located front and on the left of the dashed line in FIG. 9A) is interposed in order to suppress the change in image, the resolution increases only at this point. This appears slightly unnatural. Accordingly, by reducing the depth of field Df of the camera 429 only at this point to blur the image, it is possible to accomplish continuous, natural switching. An example of this method is shown in FIG. 9A and is suitable for actual photographing. Another method is to project the image using a camera 429 that continuously (independently of the vertical direction) change from orthographic projection (perspective projection at an infinite viewing distance) to perspective projection (perspective projection at a finite viewing distance). This method is shown in FIG. 9(B) and is suitable for computer graphics.

FIG. 10(*a*) is a table showing an example in which binocular data arrangement widths and intervals are distributed in an elemental image in the binocular and multiview compatible display mode with an II system display. This distribution is determined taking into account the ray interval between adjacent pixels (horizontally adjacent pixels for optical apertures shaped like vertical stripes or pixels corresponding to adjacent parallax for oblique optical apertures) and the interocular distance. However, with the II system, crosstalk (the mixture, in one cylindrical lens, of light rays from the adjacent pixels) may occur between the adjacent pixels. Accordingly, for the binocular and multiview compatible display, the same parallax component data must be provided for at least three columns. In examples 2-1 to 2-13 in the table shown in FIG. 10(*a*), the number of instances of parallax, the observation standard viewing distance, and the adjacent parallax ray interval at the observation standard viewing distance are assumed to be 18, 700 mm, and 17 mm, respectively. The same parallax component data is provided for three to nine columns. Furthermore, in order to prevent crosstalk with a right and left parallax component images, it may be desirable to place a black (or monochromatic) column in the center. In particular, with the binocular system, when the unwanted columns located at the opposite ends and corresponding to elemental image boundaries are shown in black, reverse three-dimensional (pseudoscopic) viewing is advantageously prevented. Further, it is advantageously easy to determine a deviation from the viewing area. The black columns have two types of widths because the elemental images for the II system intrinsically have two types of widths. In connection with the design of an II system three-dimensional display apparatus, a smaller ray interval allows lateral inter-parallax crosstalk to be more easily prevented for the binocular display. A reduction in observation standard viewing distance also enables crosstalk to be more easily prevented because it reduces the ray interval. The black display parts in FIG. 10A need not be black but are preferably white provided that the original image is based on black. These parts may have a color complementary to that on which the entire image is based (average color). FIG. 10B shows an example of the distribution of column numbers in an elemental image for a four-eye system as an example of the multiview compatible system.

FIGS. 10A and 10B are kinds of parallax arrangement tables. Providing these tables with data on elemental image width results in a sufficient amount of information for multiview compatible arrangement tables. That is, all the parallax components can be arranged all over the display surface on the basis of the tables. As described later, an II parallax arrangement table has a different form as shown in FIG. 15, owing to its different arrangement regularity.

Even if cylindrical lenses in a lenticular sheet extend obliquely, the binocular and multiview compatible display mode can be implemented by using a method similar to that shown in FIGS. 10A and 10B, for each row. The oblique lenticular sheet requires more complicated processing. However, a decrease in vertical resolution enables the horizontal resolution to be assigned to the vertical direction. Even if the cylindrical lenses in the lenticular sheet extend in the vertical direction and the pixels are arranged in a delta array, the binocular and multiview compatible display mode can be implemented by using a similar method of each row. For the delta array, a black (or monochromatic) column is particularly desirably placed between right and left instances of parallax.

The above method enables binocular and multiview data to be displayed in the compatible mode using the II system display. The horizontal resolution is the same as that in the normal mode of the II system. The II system display can be used as an upward compatible display for the binocular and multiview system.

Now, with reference to FIG. 11A to FIG. 25, description will be given of three-dimensional image display using II system parallax image arrangement. The display of a three-dimensional image shown in FIGS. 11 to 25 is implemented in combination with the display apparatus and method described with reference to FIGS. 1 to 10B.

Either with the II system or with the multiview system, the viewing distance is normally finite. Consequently, a display image, that is, a parallax interleaved image, is created so that the perspective projection image at the observation standard viewing distance is actually visible. In general, the perspective projection image is created by executing image processing (rendering for computer graphics) for each cross point at which a straight line joining a pixel and a slit together passes through a horizontal line (viewpoint height position) on an observation standard viewing distance plane. In this case, the perspective projection image may be created for each pixel and for each cross point (viewpoint) at which a plane joining a column, instead of the pixel, and a slit together crosses a horizontal line on the observation standard viewing distance plane.

Figure 11A:
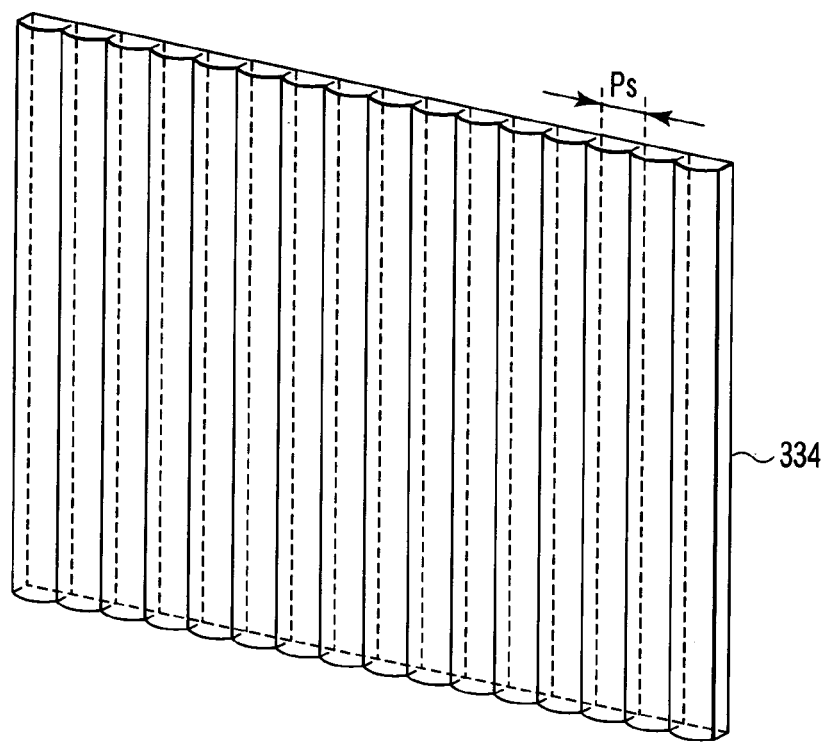
FIGS. 11A and 11B are perspective views schematically showing an example of a parallax barrier provided in the three-dimensional image display apparatus according to the embodiment of the present invention.
Figure 11B:
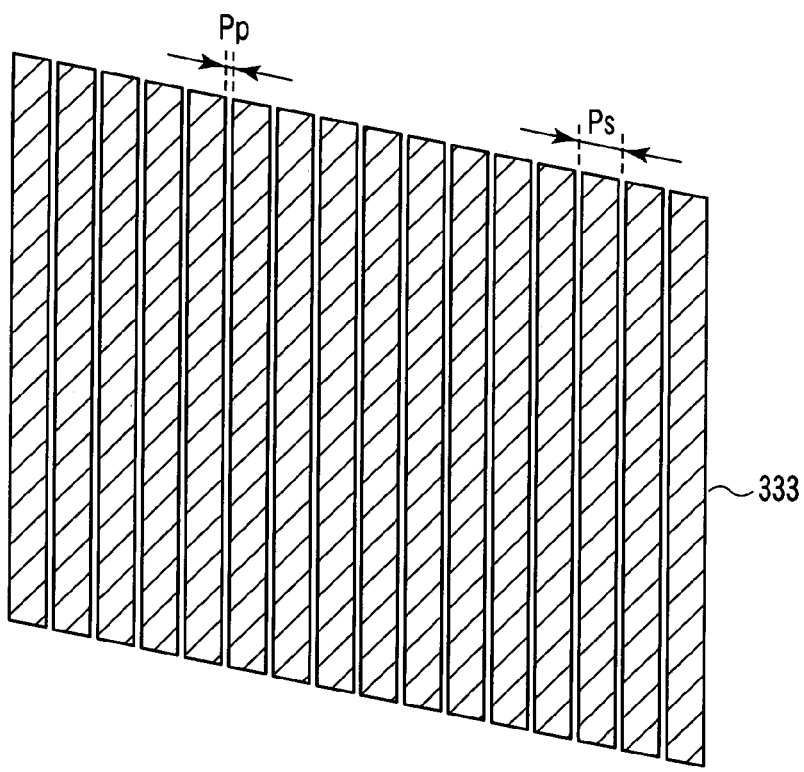

FIG. 11A shows a perspective view of a lenticular sheet 334 as an example of a parallax barrier (ray control element) having optical apertures. FIG. 11B shows a perspective view of a slit 333 as an example of a parallax barrier (ray control element) having optical apertures.

Figure 12:
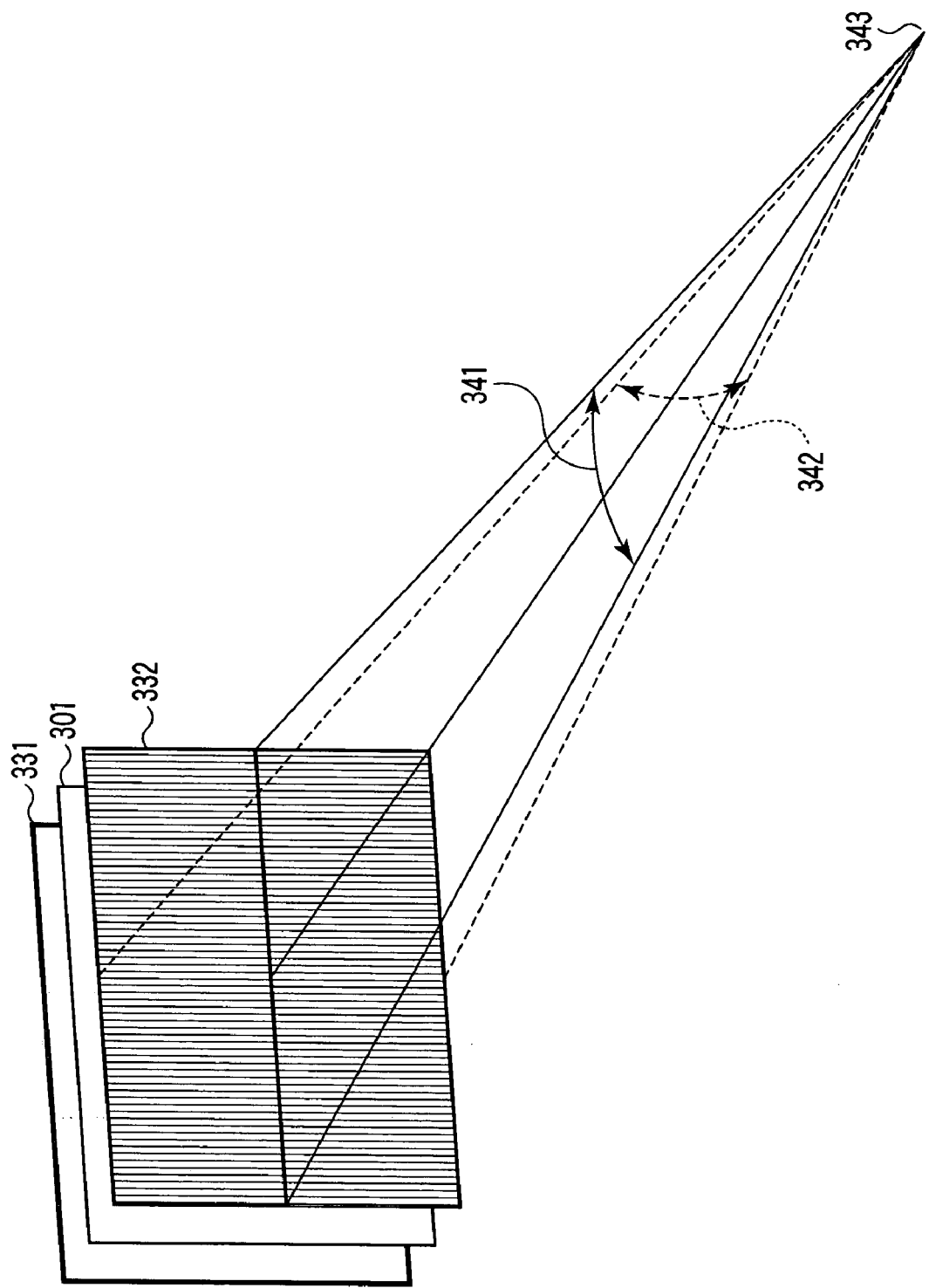
FIG. 12 is a perspective view schematically showing the three-dimensional image display apparatus according to the embodiment of the present invention.

FIG. 12 is a perspective view schematically showing the whole three-dimensional image display apparatus. In the three-dimensional image display apparatus shown in FIG. 12, an independent diffusion sheet 301 is provided between a parallax barrier 332 and the display module 331, which displays a two-dimensional image. The diffusion sheet 301 is not necessarily required for the three-dimensional image display apparatus and may thus be omitted. Further, if the two-dimensional image display module 331 is a liquid crystal display unit, the diffusion sheet 301 may be composed of a diffusion layer provided in a surface of a polarizing plate in the unit. Moreover, if the parallax barrier 332 is composed of a lenticular sheet, its back surface may have a diffusion characteristic and diffuse light rays.

Figure 13A:
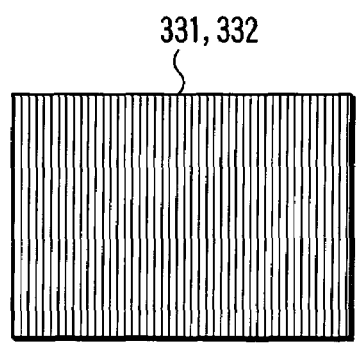
FIGS. 13A, 13B and 13C are schematic diagrams showing the relationship between elemental image pitch Pe, parallax barrier pitch Ps, a parallax barrier gap d, viewing distance L, and viewing area width W in the three-dimensional image display apparatus shown in FIG. 12.
Figure 13C:
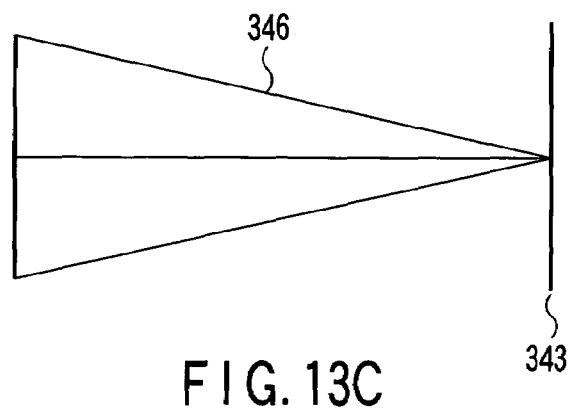
Figure 13B:
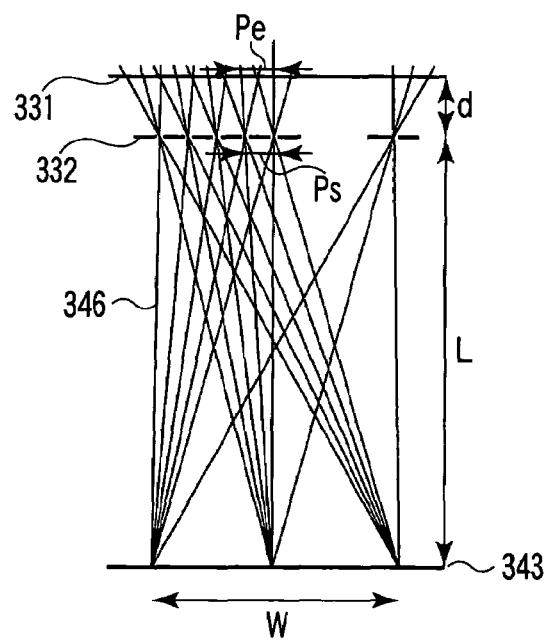

FIGS. 13A, 13B, and 13C are developments schematically showing positional relationships in vertical and horizontal planes using, as a reference, the display module of the three-dimensional image display apparatus shown in FIG. 12. FIG. 13A shows a front view of the two-dimensional image display module 331 and the parallax barrier 332. FIG. 13B shows a plan view showing how elemental images are arranged in the three-dimensional image display apparatus. FIG. 13C shows a side view of the three-dimensional image display apparatus. As shown in FIGS. 12 and 13A to 13C, the three-dimensional image display apparatus comprises the two-dimensional image display module 331, composed of liquid crystal display elements, and the parallax barrier 332, having optical apertures. The parallax barrier 332 is composed of the lenticular sheet 334 or slit 333, which is shaped so that for example, optical apertures extend linearly in the vertical direction and are periodically arranged in the horizontal direction as shown in FIGS. 13A and 13B. With the three-dimensional image display apparatus, within the range of a horizontal viewing angle 341 and a vertical viewing angle 342 as shown in FIG. 12, the observer can observe three-dimensional images in spaces in front of (closer to the observer) and behind the two-dimensional image display module 331, from the position of his or her eyes via the parallax barrier 332.

In this case, it is assumed that if minimum unit pixel groups each forming a square is counted, the two-dimensional image display module 331 have, for example, 1,920 pixels in the horizontal direction and 1,200 pixels in the vertical direction. Further, each minimum unit pixel group is assumed to contain red (R), green (G), and blue (B) pixels (sub-pixels).

In FIG. 13B, once the viewing distance L between the parallax barrier 332 and the observation standard viewing distance plane 343, the parallax barrier pitch Ps, and the parallax barrier gap d are determined, the pitch Pe of the elemental images is determined by the interval between a viewpoint on the viewing distance plane 343 and the center of each optical aperture (exit pupil, slit, or lens) projected on the display surface. Reference numeral 346 denotes a straight line joining a viewpoint position on the observation standard viewing distance L and the center of each aperture. The viewing area width W is determined on the basis of the condition that the elemental images do not overlap one another on the display surface in the display apparatus. Even if the refractive index of the medium in the parallax barrier or display apparatus causes light rays to be refracted, the straight lines 346 are considered to be light rays and P, e, and W are similarly determined taking refraction into account. Of course, W may be determined before d.

It should be noted that with a one-dimensional II system, the straight line 346 does not always pass through the center of each pixel on the display surface of the display apparatus. In contrast, with the multiview system, the line joining the viewpoint position and the center of each aperture together passes the center of the corresponding pixel. The line coincides with the locus of a light ray. If the horizontal pitch Ps of the apertures is an integral multiple of the horizontal pitch of the pixels, the pitch Pe of the elemental images has a fraction that makes the pitch Pe deviate markedly from the integral multiple of the pixel pitch Pp. Even if the horizontal pitch of the apertures is not an integral multiple of the pixel pitch Pp, with the one-dimensional II system, the pitch Pe of the elemental images has a fraction that makes the pitch Pp deviate from the integral multiple of the pixel pitch Pp. In contrast, with the multiview system, the pitch Pe of the elemental images is an integral multiple of the pixel pitch Pp.

FIGS. 14A to 14C show a method of forming a parallax component image and a parallax interleaved image for the one-dimensional II system given a set of parallel rays provided by the display apparatus shown in FIG. 12. An object (subject) 421 to be displayed as shown in FIG. 14A is projected on a projection plane 422 at the same position as that of a plane in which the parallax barrier 332 of the three-dimensional display apparatus is placed. In this case, in the normal mode, the object 421 is subjected to perspective projection (simply referred to as pers in the drawings) in the vertical direction and to orthographic projection (simply referred to as ortho in the drawings) in the horizontal direction. Consequently, an image 424 of the subject 421 is created on the projection plane 424; the image 424 has been subjected to perspective projection in the vertical direction and to orthographic projection in the horizontal direction. In this case, projection lines 425 do not cross in the horizontal direction but cross a projection central line 423 in the vertical direction; the projection central line 423 is present in the observation standard viewing distance plane. Further, as is apparent from its projection method, the projection central line 423 is extended along and parallel to the projection plane 422. In principle, the projection central line 423 lies opposite the center of the projection plane 422 in the vertical direction. This projection method is similar to a rasterizing and rendering operations in commercially available three-dimensional computer graphics creating software except that the projection method varies between the vertical direction and the horizontal direction. A normal located in the center of the projection plane 422 normally crosses the projection central line 423. However, the normal need not cross the projection central line 423 if for example, the projection plane 422 of the resulting three-dimensional image is to be located vertical to a floor surface so that the observer can look down at the floor surface and the subject 421 on it.

An image (parallax component image) 426 for one direction is divided into pieces corresponding to respective columns extending in the vertical direction as shown in FIG. 14B; the image 426 has been projected on the projection plane 422 perspectively in the vertical direction and orthographically in the horizontal direction. Then, as shown in FIG. 14C, the columns are separately arranged on a display surface 427 of the display apparatus (parallax interleaved image) at intervals (each corresponding to a specified number of columns) equal to the pitch (aperture pitch) of the optical apertures.

The above projecting and image distributing operations are repeated for the other projection directions 428 shown in FIG. 14A. This completes an entire image (parallax interleaved image) to be displayed on the display surface 427. FIG. 14A shows only eight projection directions 428, −4, −3, −2, −1, 1, 2, 3, and 4. However, several tens of directions are required on the basis of the viewing distance. FIG. 15 shows an example of 34 directions. The projected image 426 may be created using only the required range of columns. The table in FIG. 15 shows the required range. The table in FIG. 15 shows parallax numbers from −17 to −1 and +1 to +17, which correspond to the 34 projection directions. In FIGS. 16A and 16B, the shaded parts indicate the minimum required projection ranges (slit or lens number and 3D pixel number) of the parallax component image no. −17 as well as the arrangement range (LCD pixel number and LCD sub-pixel number) of the parallax component image in the parallax interleaved image.

The directions 428 are not separated by an equal angle but are set so as to lie at equal intervals on the viewing distance plane (projection central line 423). That is, each parallax component image is photographed by moving the camera 429 parallel on the projection central line by an equal pitch (the orientation is fixed). Further, the orientation and position of the projection plane 422 are fixed regardless of the projection direction.

FIG. 17 shows an example of a parallax arrangement table for a typical multiview display apparatus that is not the present invention but is a comparative example; the multiview display apparatus has the same number of instances of parallax as that according to the present invention and has a common configuration in which the elemental image pitch is an integral multiple of the pixel pitch. As shown in the table, parallax component images are uniformly arranged on the display surface (entire parallax interleaved image). This does not apply to the parallax image arrangement table for the binocular and multiview compatible display mode as also shown in FIG. 4.

Figure 18:
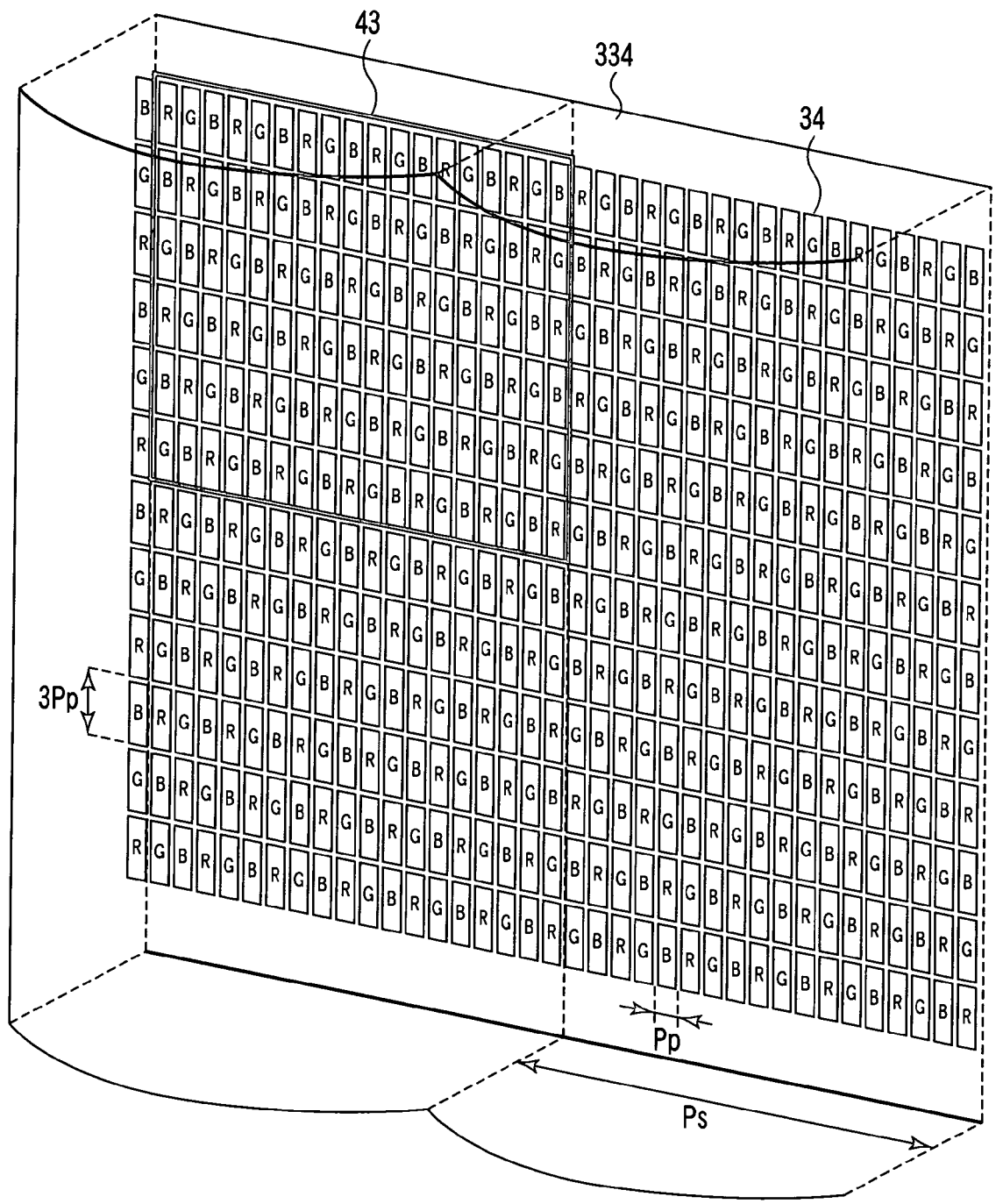
FIG. 18 is a perspective view schematically showing the positional relationship between pixels and elemental images and a parallax barrier according to a parallel-ray one-dimensional integral imaging system, in a part of the three-dimensional image display apparatus shown in FIG. 12.

FIG. 18 is a partial enlarged view schematically showing the arrangement of the parallax barrier (in this case, the lenticular sheet 334) of the three-dimensional image display apparatus shown in FIGS. 12 to 16. As shown in FIG. 18, the lenticular sheet 334 is placed in front of a display surface such as a liquid crystal panel which two-dimensionally displays a parallax image, the lenticular sheet 334 includes a large number of cylindrical lenses, each having a major axis which extends in the vertical direction, and serves as a parallax barrier having optical apertures. The optical apertures may be obliquely extended or formed like steps. Pixels 32 each having an aspect ratio of 3:1 are arranged in matrix along the horizontal and vertical directions. In the same pixel row and in the same column, red, green, and blue pixels are alternately arranged. The arrangement of pixels (sub-pixels in a typical liquid crystal display apparatus) is generally called a mosaic array. Reference numeral 43 denotes an effective pixel that is a unit used to distribute 18 parallax component images when a three-dimensional image is displayed (one effective pixel 43 is shown by the black frame in FIG. 18). The effective pixel may be a square as shown in this example or a rectangle (obtained by dividing the square 43 into two in the vertical direction) having a vertical resolution double that of the square 43 so as to comply to the minimum vertical period (the period of R, G, and B).

Figure 19:
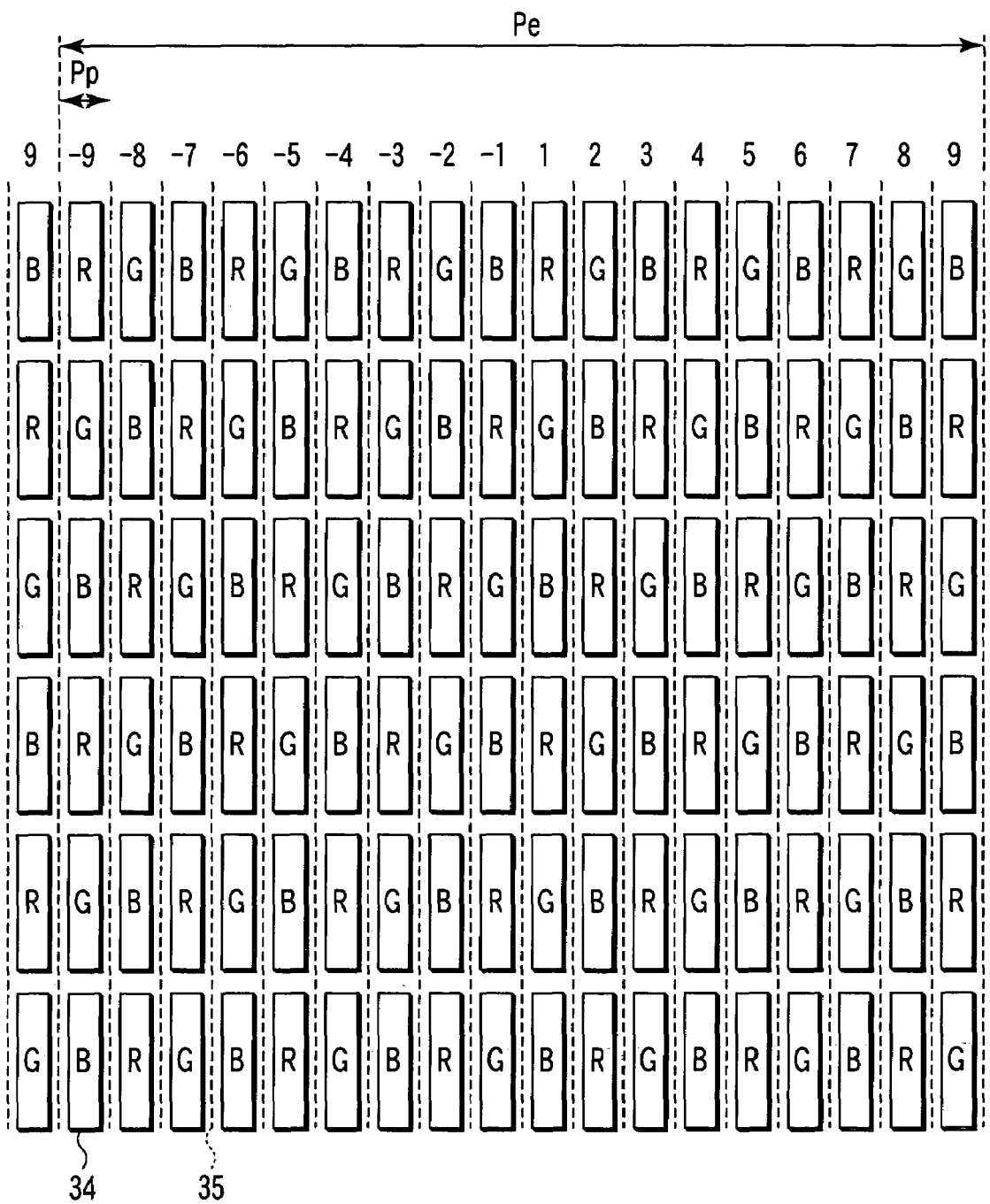
FIG. 19 is a front view schematically showing the array of pixels and the arrangement of parallax images in the normal display mode and in the compressed and emphasized display mode, in a part of the three-dimensional image display apparatus shown in FIG. 18.

FIG. 19 shows an example of the arrangement of the pixels contained in the effective pixel 43 shown in FIG. 18. In FIG. 15, the parallax number −10 appears before the lens number −10 and the parallax number 10 appears after the lens number 10. Accordingly, FIG. 19, showing the parallax numbers −9 to 9, corresponds to the lens numbers −9 to −1 and 1 to 9. The adjacent parallax numbers are assigned to adjacent columns. The vertical period of the pixel rows is set triple the horizontal period Pp of the columns. Each pixel 34 has a pixel opening or light emitting pixel portion with a specified area ratio. The pixel opening is surrounded by a black matrix 35. In this manner, the pixel openings and the black matrices 35 constitute a pixel period in the horizontal direction. Thus, the lenticular sheet 334, placed in front of the display surface, has optical apertures arranged at a horizontal period that is an integral multiple of the pixel period Pp. That is, the cylindrical lenses in the lenticular sheet are arranged so that the optical axes of the lenses are located at positions corresponding to integral multiples of the pixel period Pp. If the parallax barrier 332 having optical apertures is a slit instead of the lenticular sheet, the central axes of the optical apertures are located at positions corresponding to integral multiples of the pixel period Pp.

With respect to the entire display screen, this integral multiple arrangement may result in moiré or color moiré. To suppress the moiré, the diffusion layer provided in the surface of the polarizing plate may execute a diffusion process (haze) more effective than that executed by a diffusion layer provided in the surface of a polarizing plate in a typical liquid crystal display apparatus in order to prevent mirror reflection. The diffusion layer may be integrated with the surface of the polarizing plate of the liquid crystal display apparatus or with a back surface of the lenticular sheet or may beam independent diffusion sheet.

With the arrangement of the display module, in which the pixels 34 in 18 columns and 6 rows constitute one effective pixel 43 as shown in FIG. 18, it is possible to display a three-dimensional image while providing 18 parallax in the horizontal direction. This display arrangement provides 18 viewpoints in case of the multiview system. An elemental image displayed in the effective pixel 43 has a pitch of 18 pixels and the horizontal pitch of the parallax barrier is smaller than 18 pixels in case of the multiview system.

For the II system, an elemental image is similarly displayed in the effective image 43. Further, for example, the parallax barrier pitch Ps is equal to 18 pixels so as to provide a set of parallel rays. With this II system design, elemental image boundaries occur at intervals of slightly larger than 18 pixels (for example, 18.02). Accordingly, the width of the effective pixel is equal to 18 or 19 columns depending on a position in the display surface. That is, the average of the elemental image pitches is larger than the width Pp of 18 pixels. Further, the horizontal pitch of the parallax barrier 332 is equal to 18 pixels. The effective pixel 43 has an aspect ratio of 1:1 and has a square arrangement. Consequently, the vertical direction can be displayed using substantially the same effective resolution as that in the horizontal direction.

Figure 20:
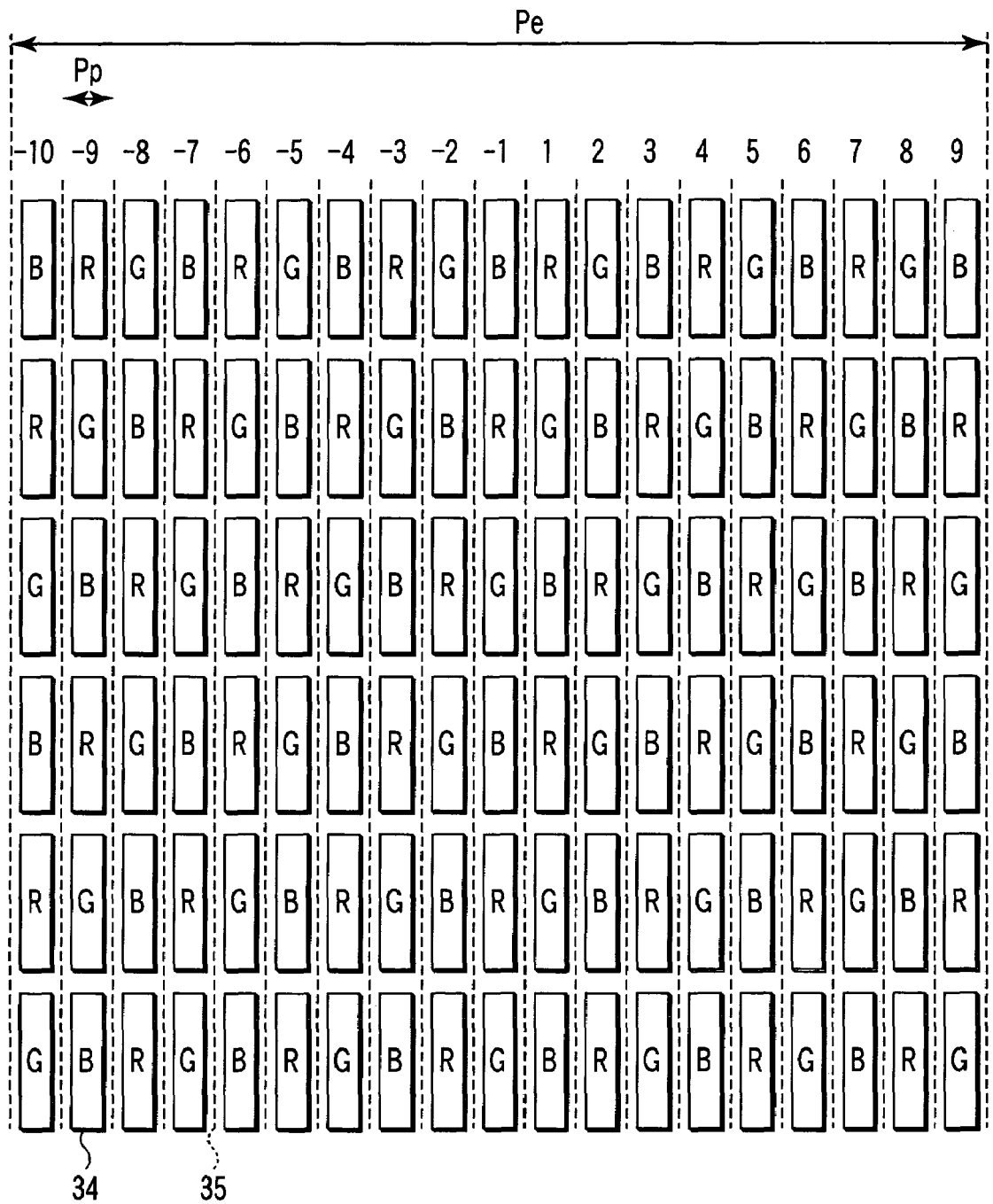
FIG. 20 is a front view schematically showing the array of pixels and the arrangement of parallax images in the normal display mode and in the compressed and emphasized display mode, in a part of the three-dimensional image display apparatus shown in FIG. 18 which part is different from that shown in FIG. 19.

FIG. 20 shows an example of a part of the arrangement of pixels in the effective pixel 43 shown in FIG. 18, the part being different from that shown in FIG. 19. In FIG. 15, both parallax numbers −10 and 9 appear only at the lens number −10. Accordingly, FIG. 20 corresponds to the lens number −10. The numbers −10 to 0 denote the parallax, and the adjacent parallax numbers are assigned to adjacent columns. That is, FIG. 20 shows an example in which the width of the effective pixel is equal to 19 columns. Thus, with the II system, some effective pixels (elemental images) have a width equal to 19 columns. Accordingly, the range of parallax numbers within an elemental image varies from the center toward the right or left end of the screen. In contrast, with a typical multiview system display, the range of parallax number shown in FIG. 19 is maintained all over the screen.

Figure 21:
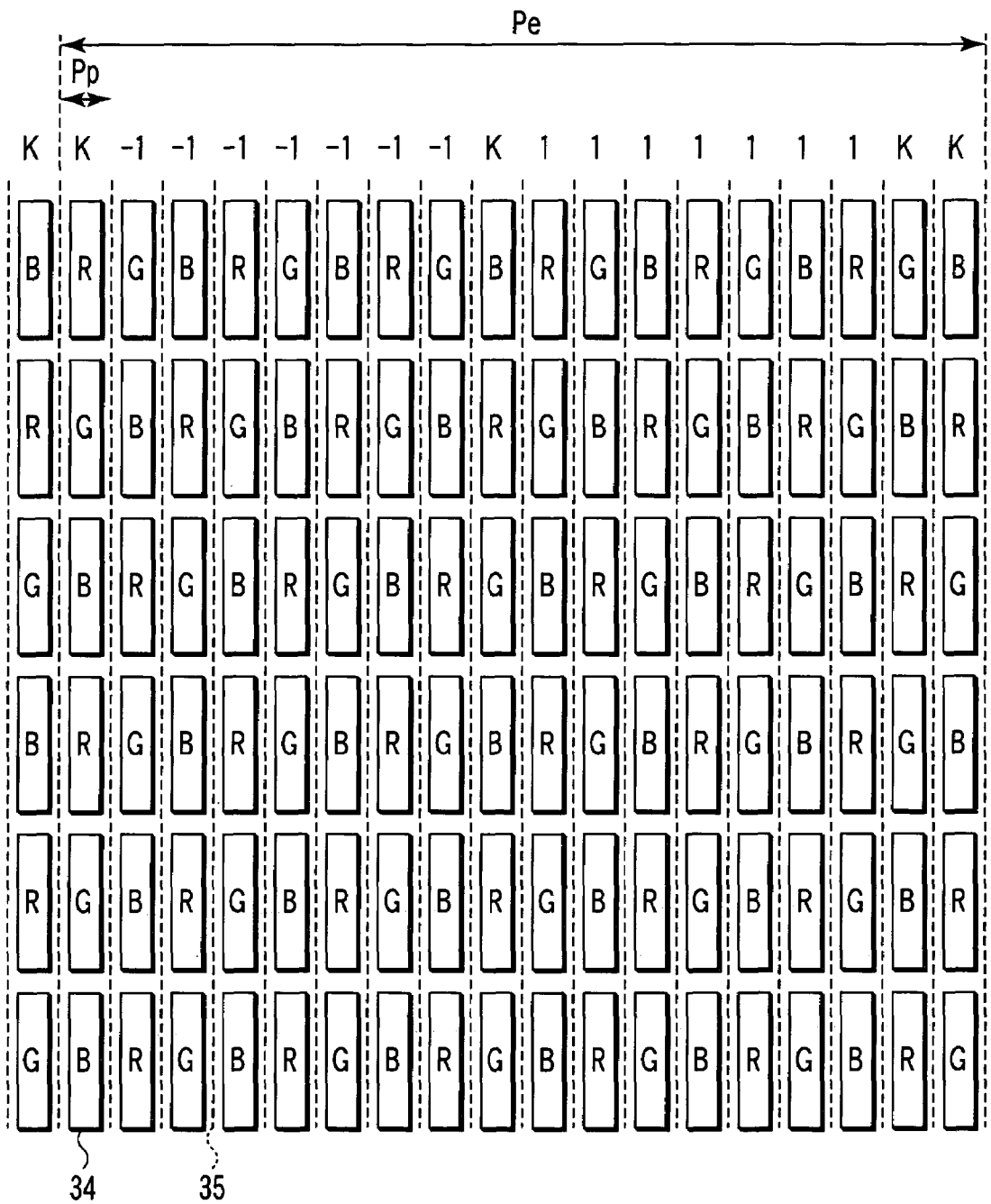
FIG. 21 is a front view schematically showing the array of pixels and the arrangement of parallax images in a binocular and multiview compatible display mode, in a part of the three-dimensional image display apparatus shown in FIG. 18 which part is the same as that shown in FIG. 19.

FIG. 21 shows an example of the binocular compatible mode for the arrangement of pixels in the effective element 43 shown in FIG. 18. This corresponds to the example 2-10 in FIG. 10A. The parallax numbers −1 and 1 denote a right- and left-eye parallax components, respectively. Reference character K denotes a black image for parallax separation.

Figure 22:
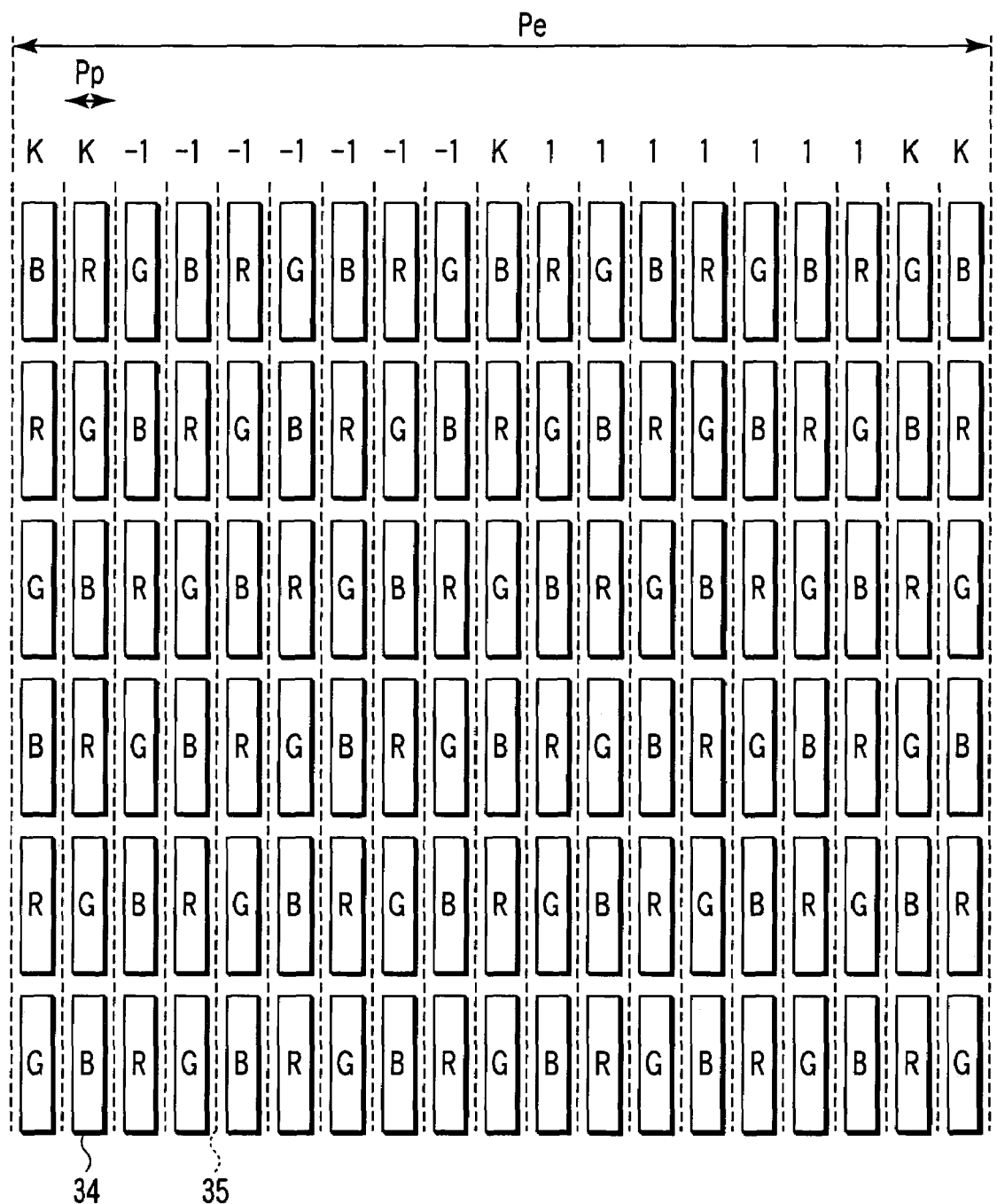
FIG. 22 is a front view schematically showing the array of pixels and the arrangement of parallax images in the binocular and multiview compatible display mode, in a part of the three-dimensional image display apparatus shown in FIG. 18 which part is the same as that shown in FIG. 20.

FIG. 22, like FIG. 21, shows an example (corresponding to the example 2-10 in FIG. 10A) of the binocular compatible mode for the arrangement of pixels in the effective element 43 shown in FIG. 19. Thus, even in the binocular compatible mode, the effective pixel has a width equal to 19 columns at the same lens number (3D pixel number).

In the description below, it is assumed that if minimum unit pixel groups each forming a square are counted, the two-dimensional image display apparatus has, for example, 1,920 pixels (corresponding to the LCD pixel numbers 1 to 1920) in the horizontal direction and 1,200 pixels in the vertical direction, as shown in FIG. 15. Further, each minimum unit pixel group is assumed to contain red, green, and blue sub-pixels (RGB). These sub-pixels correspond to the LCD sub-pixel numbers 1 to 5,760, shown in FIG. 15.

Figure 23:
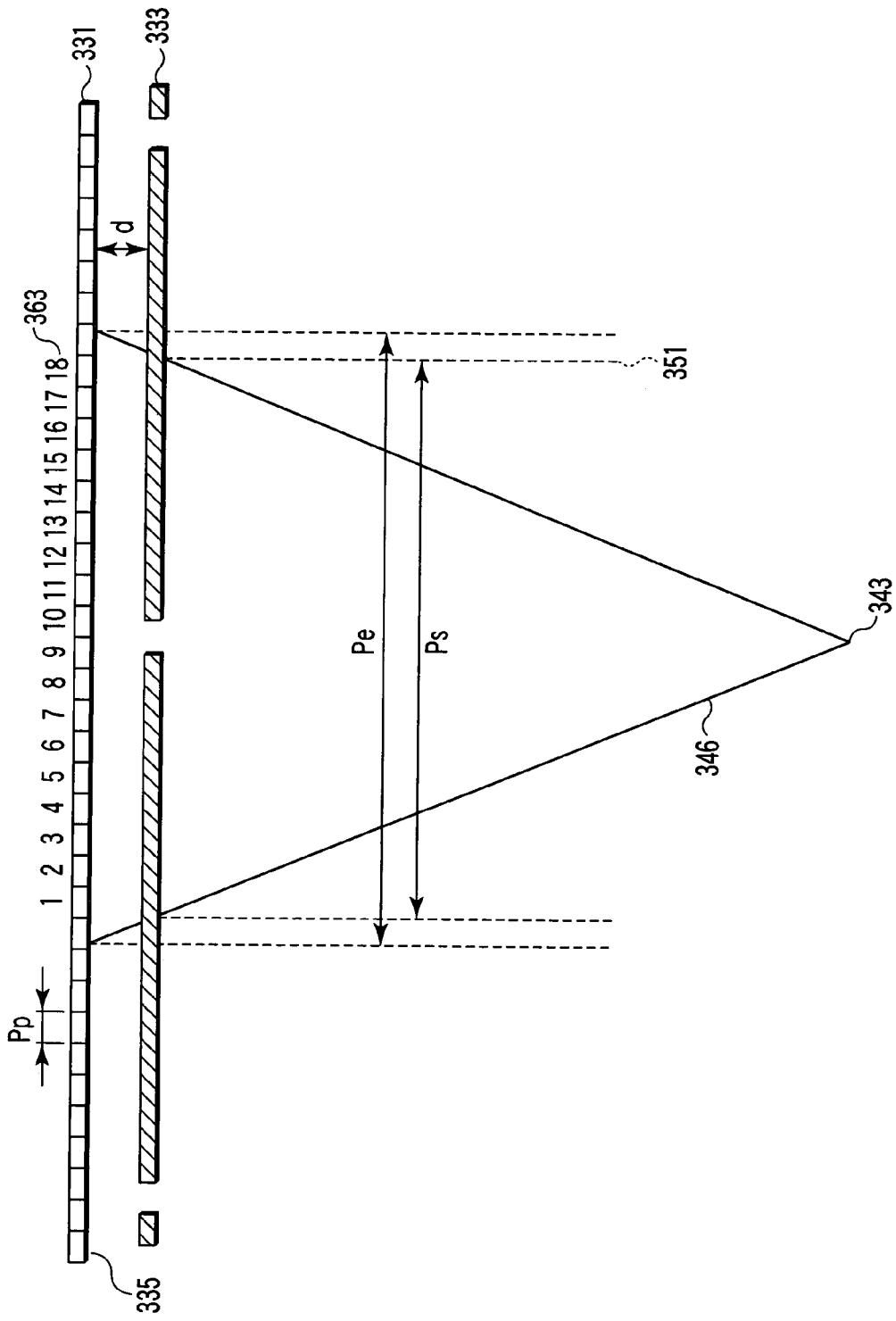
FIG. 23 is a schematic diagram schematically showing the positional relationship between pixels and elemental images and a parallax barrier according to the parallel-ray one-dimensional integral imaging system, in the three-dimensional image display apparatus shown in FIG. 12.
Figure 24:
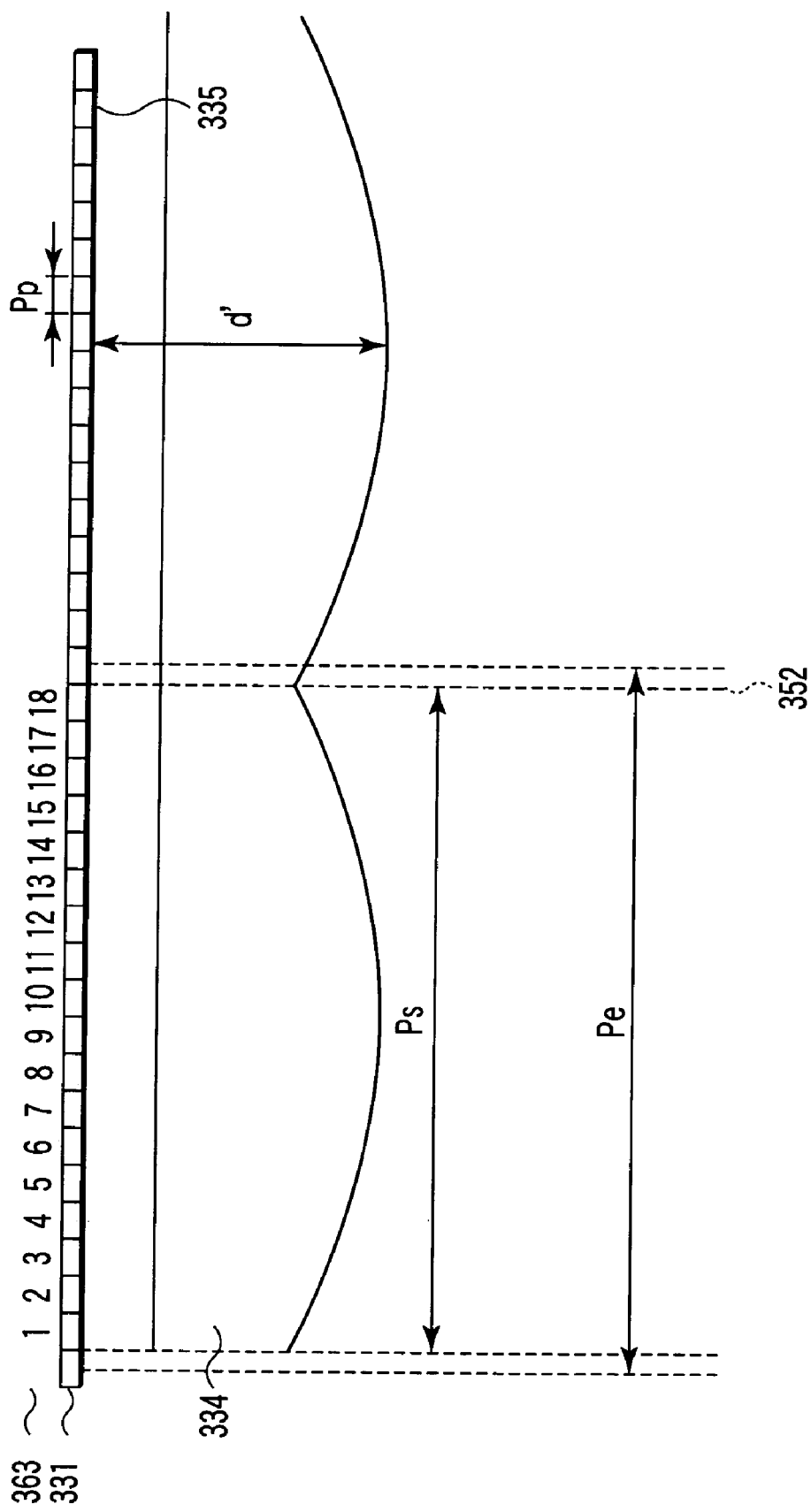
FIG. 24 is a schematic diagram schematically showing the positional relationship between pixels and elemental images and a parallax barrier according to the parallel-ray one-dimensional integral imaging system, in the three-dimensional image display apparatus shown in FIG. 12.

FIG. 23 or 24 schematically shows a horizontal cross section of the display module of the three-dimensional image display apparatus. As shown in FIG. 23 or 24, the horizontal pitch Ps (period) of the slit 333 or of the cylindrical lenses in the lenticular sheet 334 is set exactly at an integral multiple of the horizontal pitch Pp of the pixels. That is, a pixel boundary is assumed to be passed by a central axis 351 (perpendicular to the display surface) passing through the center between the adjacent optical apertures in the slit 333 or a reference axis 352 (perpendicular to the display surface) passing through the boundary between the adjacent cylindrical lenses. An integral number of pixels are arranged in the area between the central axes 351 or reference axes 352. The horizontal pitch Ps (period) of the central axes 351 or reference axes 352 is set at a specified value. In the example shown in FIG. 23 or 24, the pitch Ps is set equal to 18 pixels. The gap d or d' between the display surface 331 of the display apparatus and parts of the parallax barrier 333 or 334 which correspond to the optical apertures is effectively set at about 2 mm taking into account the refractive index of the material of a glass substrate of the display apparatus or a glass substrate provided with the slit or the lenticular sheet. As described above, with one-dimensional integral imaging, the pitch Ps of the parallax barrier (not the pitch Ps that is visible as a result of the difference in distance but the actual pitch Ps of the parallax barrier) is an integral multiple of the pixel pitch Pp. In contrast, with the multiview system, the elemental image pitch Pe is generally an integral multiple of the pixel pitch Pp.

Figure 25:
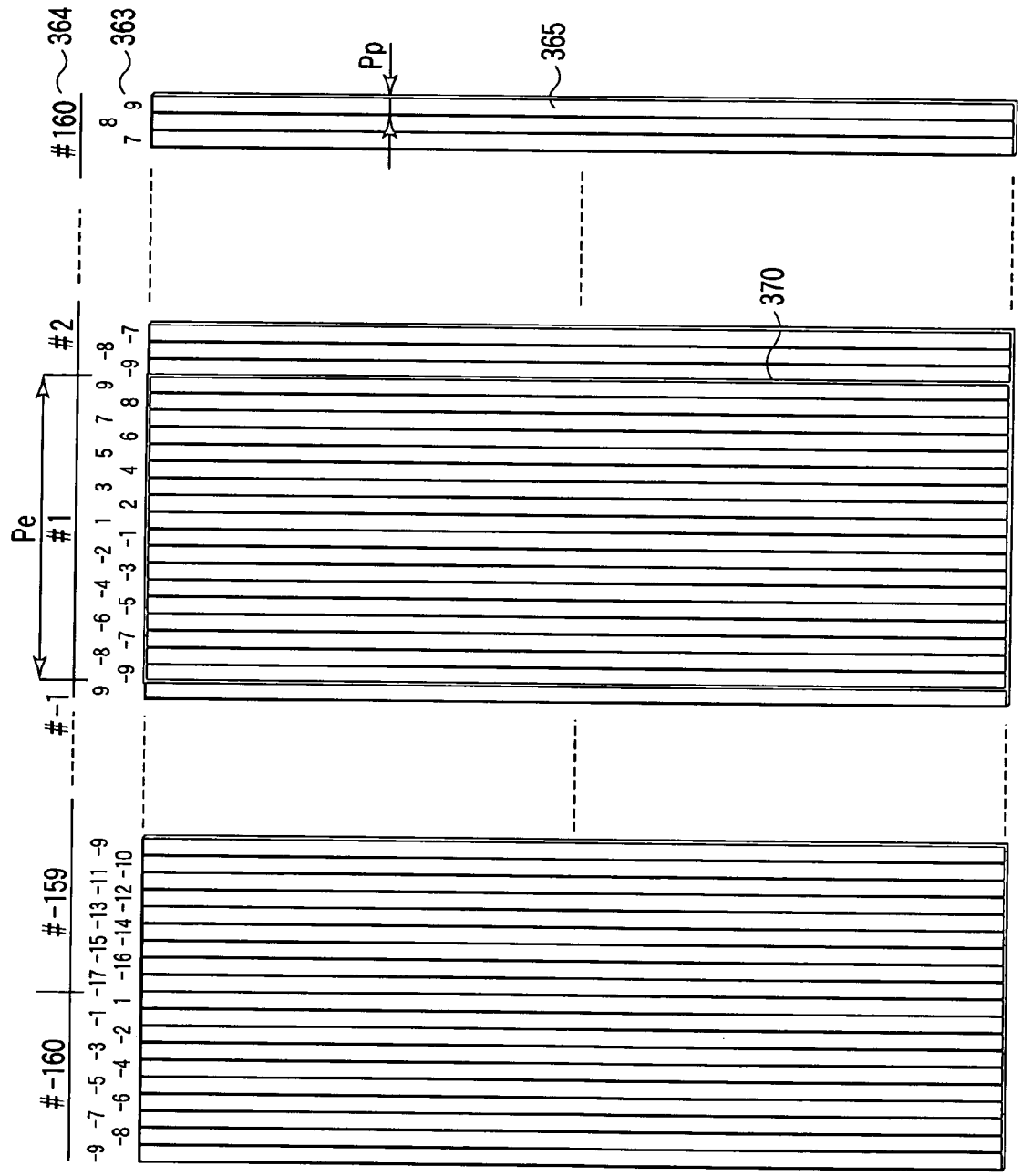
FIG. 25 is a schematic diagram schematically showing a method of rearranging parallax component images in a parallax interleaved image (display surface) according to the parallel-ray one-dimensional integral imaging system in the three-dimensional image display apparatus shown in FIG. 12.

FIG. 25 is a conceptual drawing of a method of rearranging images in the display surface of the display apparatus for the parallel-ray II system as viewed from front of the display module 331. The display surface of the display module 331 is divided into pixel groups that display elemental images 370 (enclosed by a thick frame) corresponding to the respective apertures (the optical apertures of the parallax barrier). With the II system, each of the elemental images is displayed in a pixel group (its width is denoted by Pe) composed of 18 or 19 columns. The total number of columns to which parallax can be assigned is 5,670 because each LCD pixel consists of three LCD sub-pixels. The number of apertures is 320 (in FIG. 25, the range of aperture numbers (lens or slit numbers) shown in the area denoted by reference numeral 364 is #−160 to #−1 and #1 to #160). The aperture pitch Ps is equal to the width of 18 columns. In FIG. 25, in each column 365, the corresponding parallax number is shown, as an item, in the area shown by reference numeral 363 (in this example, one of the parallax numbers −17 to −1 and 1 to 17 for 34 directions as also shown in FIG. 15). The elemental image with the aperture number #1 consists of 18 parallax components with the parallax numbers −9 to −1 and 1 to 9. The elemental image with the aperture number #−159 consists of 18 parallax components with the parallax numbers −17 to −1 and 1. The width of each elemental image is slightly larger than the width of 18 columns. Accordingly, when the boundary between the adjacent elemental images is aligned with the nearest column boundary (normal A-D conversion method), the number of columns per aperture is 18 for most apertures, but 19 for some apertures. At each aperture number corresponding to 19 columns, the range of parallax numbers in the aperture is shifted by one. The aperture numbers corresponding to 19 columns are #10, #30, #49, #69, #88, #107, #127, and #146 (and the same numbers each with a minus sign) (viewing distance: 700 mm).

FIG. 15 shows aperture numbers (slit (lens) numbers in the table) at which the arrangement of parallax component images in each direction starts and ends. The table also shows column numbers (3D pixel numbers) based on the horizontal resolution obtained when the corresponding three-dimensional image is displayed, and sub-pixel column numbers (LCD sub-pixel numbers) and pixel column numbers (LCD pixel numbers) on the parallax interleaved image display module. The three-dimensional image is displayed by assigning the parallax component images as described above. In FIG. 16, the shaded parts indicate the minimum projection range (slit or lens number and 3D pixel number) of the parallax component image no. −17 and the arrangement range (LCD pixel number and LCD sub-pixel number) of the parallax component image in the parallax interleaved image. The parallax component image in the left of FIG. 16 uses only the shaded part. However, common input data not specifically provided for the II system display apparatus may use the total range instead of only the shaded part. This does not pose any problem. The shaded part in this example corresponds to the range of 14 columns (15−2+1 or (−146)−(−159)+1) in terms of 3D pixel numbers or slit (lens) numbers. In the parallax interleaved image in the right of FIG. 16, the above 14 columns are dividedly arranged every 18 columns within the shaded range. In this case, both the number of columns and the number of instances of parallax are 18. Since the 14 columns in the parallax component image are arranged in every 18 columns, the range of LCD sub-pixel numbers corresponds to 235 columns (245−11+1 is equal to 18×(14−1)+1). The range of LCD pixel numbers corresponds to 79 columns (82−4+1), which is about one-third of the range of LCD sub-pixel numbers (LCD sub-pixel numbers 11 and 245 belong to LCD pixel numbers 4 and 82). FIG. 15 shoes these column ranges, illustratively described in FIG. 16, for all the parallax numbers.

Not only in the compressed and emphasized display mode but in the normal display mode and binocular and multiview compatible mode, the observation standard viewing distance, which determines the elemental image width, need not necessarily be the same as the distance used as a reference for perspective projection (the distance between the projection center line and the projection plane). No particular problem occurs provided that the distances have roughly close values (the ratio of the distances is about ½ to 2).

As described above, for the parallel-ray II system, the three-dimensional display apparatus according to the embodiment of the present invention can display perspective projection images for the binocular and multiview system or the like as well as three-dimensional images compressed on the front- and rear-sides and emphasized in the vertical and horizontal directions.

FIG. 26 schematically shows a method of capturing a three-dimensional image according to the embodiment of the present invention. FIGS. 27A and 27B show flowcharts of a process procedure used for the method of capturing a three-dimensional image, which method is shown in FIG. 26. As shown in FIG. 26, a subject position detector 431 is installed in a central position of a row of cameras 429 arranged at equal intervals in the horizontal direction. All the cameras 429 are adjusted so that an image containing subjects 421$a$ and 421$b$ is captured by projecting it on a projection plane 422. In this case, the focus is on 421$b$, located close to the projection plane. Values predetermined on the basis of the configuration of the display apparatus are input for the z coordinate zn of the front-side limit, the z coordinate zf of the rear-side limit, the observation standard viewing distance (normal camera distance) L, and the appropriate camera interval (normal camera interval) P. This allows the derivation of relational expressions on the ratio a of the camera interval to the appropriate camera interval, the depth compression scale factor b, the ratio q of the camera distance to the observation standard viewing distance, the z coordinate zn of the front-side limit, and the z coordinate zf of the rear-side limit.

In the example shown in FIG. 27A, the detector 431 detects the distance to the position of a part of the subject 421a, which is closest to the camera 429. The detector 431 also uses an auto focusing function or manual focusing function to detect the distance to the subject 421b, on which the camera is to be focused. Further, photographing plane (projection plane) size information (the ratio of the photographing plane size to the display surface size) is obtained on the basis of the angle of view detected using a zoom function. On the basis of these data, the compression ratio b is determined (steps S30, S31, and S32). The camera distance ratio q is also determined (steps S30 and S33). Subsequently, the optimum camera 429 interval ratio a is determined from the relation expressions on the camera interval ratio a, the scale factor b, the camera distance ratio q, the z coordinate zn of the front-side limit, and the z coordinate zf of the rear-side limit (steps S34 and S35). The optimum camera 429 interval ratio a is displayed or the photographer is warned that the camera 429 internal does not meet the condition (steps S36 and S37). The camera may have a function for automatically adjusting the camera 429 interval to the optimum value. The camera 429 interval may be mechanically varied or equivalently varied using an optical system or circuit processing. Alternatively, it is possible to select one of a large number of cameras 429 closely installed on a straight line which corresponds to the optimum interval. In the example shown in FIG. 27B, the detector 431 uses the auto focusing function or manual focusing function to detect the distance to the subject 421b, on which the camera is to be focused. Further, photographing plane (projection plane) size information (the ratio of the photographing plane size to the display surface size) is obtained on the basis of the angle of view detected using the zoom function. On the basis of these data, the camera distance ratio q is also determined (steps S40 and S41). Subsequently, on the basis of the camera 429 interval ratio a and a compression ratio b that are, for example, manually preset (steps S42 and S43), the apparatus determines whether the distance to the nearest subject 421a detected by the detector 431 (step S44) exceeds the front- or rear-side limit area zn or zf (step S46). If the distance exceeds the front- or rear-side limit area zn or zf, warning is given or the optimum camera 429 interval a is displayed (steps S47 and S48).

The above method of capturing a three-dimensional image suppresses the blur or distortion of an image resulting from an excessive nearness or the like. The method also enables images to be captured in a manner suitable for the apparatus and method of displaying a three-dimensional image according to the present invention.

The present invention is not limited to the as-described embodiment. In implementation, any of the components of the embodiment can be varied without departing from the spirit of the present invention.

Further, various inventions can be formed by appropriately combining a plurality of the components disclosed in the above embodiment. For example, any of the components shown in the embodiment may be deleted. Moreover, the components of the above embodiment may be combined with components according to a different embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image display apparatus comprising:
    a display module including a display surface having a vertical direction and a horizontal direction, in which pixels each having a predetermined width are arranged in rows and columns;
    a parallax barrier installed in front of the display module and having optical apertures each extending substantially linearly and arranged at a horizontal pitch equal to a integral multiple of the predetermined width of the pixel, the optical apertures so controlling light rays from the pixels as to define, on the display surface, elemental images each of which has a width determined depending on an observation standard viewing distance;
    a first processing unit configured to divide a parallax component image into pieces corresponding to the respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint; and
    a second processing unit configured to divide a parallax component image into pieces corresponding to the respective columns in a compressed and emphasized display mode, the parallax component image being obtained by subjecting the subject to perspective projection substantially determined by the viewing distance in both vertical and horizontal directions, each predetermined range of the elemental images being allotted to one column and displayed on the display module to generate a three-dimensional image with a continuous viewpoint in which a subject image is compressed in a depth direction and emphasized in the vertical and horizontal directions.

2. The three-dimensional display apparatus according to claim 1, further comprising a third processing unit configured to divide a parallax component image into pieces corresponding to respective columns in a multiview compatible mode, the parallax component image being obtained by subjecting the subject to perspective projection substantially determined by the viewing distance in both vertical and horizontal directions, each predetermined range of the elemental images being allotted to a plurality of adjacent columns as the same parallax information and displayed on the display module to generate a three-dimensional image with multiple viewpoints.

3. The three-dimensional display apparatus according to claim 1, further comprising a selecting unit configured to select one of the first and second processing units.

4. The three-dimensional display apparatus according to claim 2, further comprising a selecting unit configured to select one of the first, second, and third processing units.

5. The three-dimensional display apparatus according to claim 2, wherein the selecting unit selects one of the second and third processing units when an image obtained by actually photographing the subject is to be displayed.

6. The three-dimensional display apparatus according to claim 2, wherein the third processing unit is configured to display a two-dimensional image instead of the three-dimensional image by compressing the subject image in the depth direction using a high compression ratio.

7. The three-dimensional display apparatus according to claim 2, wherein the third processing unit configured to display black or a predetermined color in the column between the parallax component images.

8. A method of displaying a three-dimensional image on a three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures controlling light rays from the pixels, and defining, on the display surface, elemental images each of which has a width determined depending on an observation standard viewing distance; and a first processing unit configured to divide a parallax component image into pieces corresponding to respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint;

the method of displaying a three-dimensional image comprising:

dividing a parallax component image into pieces corresponding to respective columns, the parallax component image being obtained by subjecting the subject to perspective projection substantially determined by the viewing distance in both vertical and horizontal directions, allotting each column to a corresponding predetermined range of the elemental images, and displaying the columns on the display module to display a three-dimensional image with a continuous viewpoint in which a subject image is compressed in a depth direction and emphasized in the vertical and horizontal directions using a compressed and emphasized display mode, wherein on the basis of a photographing standard condition that a horizontal interval for perspective projection photographing of each parallax component is determined depending on a horizontal interval for positions at which the pixels are projected via the parallax barrier at the viewing distance, a wide-angle projecting process is executed by setting a distance between the photographing position and a projection plane q times as long as a viewing distance based on the standard condition and setting the horizontal interval for the perspective projection photographing of each parallax component at most q/b of the standard condition to compress the subject in the depth direction by a factor of b.

9. The method of displaying a three-dimensional image according to claim 8, wherein the normal display mode and the compressed and emphasized display mode are continuously switched by continuously varying a perspective projection central distance in the vertical direction.

10. The method of displaying a three-dimensional image according to claim 8, wherein when the normal display mode and the compressed and emphasized display mode are switched, the switching is continuously carried out by reducing an interval for the perspective projection photographing, while simultaneously reducing a depth of field.

11. The method of displaying a three-dimensional image according to claim 8, wherein the normal display mode and the compressed and emphasized display mode are automatically switched by detecting a position of the subject.

12. A method of capturing and displaying a three-dimensional image on the three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures controlling light rays from the pixels, and defining, on the display surface, elemental images each of which has a width determined depending on an observation standard viewing distance; and a first processing unit configured to divide a parallax component image into pieces corresponding to respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint;

the method of displaying a three-dimensional image comprising dividing a parallax component image into pieces corresponding to respective columns, the parallax component image being obtained by subjecting the subject to perspective projection substantially determined by the viewing distance in both vertical and horizontal directions, allotting each column to a corresponding predetermined range of the elemental images, and displaying the columns on the display module of the three-dimensional image display apparatus to display a three-dimensional image with a continuous viewpoint in which a subject image is compressed in a depth direction and emphasized in the vertical and horizontal directions using a compressed and emphasized display mode, wherein on the basis of a photographing standard condition that a horizontal interval for perspective projection photographing of each parallax component is determined depending on a horizontal interval for positions at which the pixels are projected via the parallax barrier at the viewing distance, a wide-angle projecting process is executed by setting a distance between the photographing position and a point of regard of the subject q times as long as a viewing distance based on the standard condition and setting the horizontal interval for the perspective projection photographing of each parallax component at most q/b of the standard condition to compress the subject in the depth direction by a factor of b.

13. The method of capturing and displaying a three-dimensional image according to claim 12, wherein the horizontal interval for the perspective projection photographing is automatically controlled by detecting a distance from a camera to a part of the subject which is closest to the camera and a camera focal distance for the perspective projection photographing.

14. The method of capturing and displaying a three-dimensional image according to claim 12, wherein an appropriate horizontal interval range for the perspective projection photographing is displayed or a photographer is warned that the horizontal interval exceeds the appropriate range, by detecting a distance from a camera to a part of the subject which is closest to the camera and a camera focal distance for the perspective projection photographing.

15. A three-dimensional image display apparatus comprising:

a display module including a display surface having a vertical direction and a horizontal direction, in which pixels each having a predetermined width are arranged in rows and columns;

a parallax barrier installed in front of the display module and having optical apertures each extending substantially linearly and arranged at a horizontal pitch equal to a integral multiple of the predetermined width of the pixel, the optical apertures controlling light rays from the pixels, and defining, on the display surface, elemental images each of which has a width determined depending on an observation standard viewing distance;

a first processing unit configured to divide a parallax component image into pieces corresponding to respective columns in a normal display mode, the parallax component image being obtained by subjecting the subject to perspective projection substantially determined by the viewing distance in the vertical direction and to orthographic projection in the horizontal direction, each predetermined range of the elemental images being allotted to one column and displayed on the display module to generate a three-dimensional image with a continuous viewpoint; and a second processing unit configured to divide a parallax component image into pieces corresponding to respective columns in a multiview compatible mode, the parallax component image being obtained by subjecting the subject to perspective projection substantially determined by the viewing distance in both vertical and horizontal directions, each predetermined range of the elemental images being allotted to a plurality of adjacent columns as the same parallax information and displayed on the display module to generate a three-dimensional image with multiple viewpoints.

16. The three-dimensional display apparatus according to claim 15, further comprising a selecting unit configured to select one of the first and second processing units.

17. The three-dimensional display apparatus according to claim 15, wherein the second processing unit displays black or a predetermined color in the column between the parallax component images.

* * * * *